United States Patent [19]
Kokaji

[11] Patent Number: 5,610,938
[45] Date of Patent: Mar. 11, 1997

[54] SPREAD SPECTRUM COMMUNICATION SYSTEM HAVING A MINIMIZED BIT ERROR RATE

[75] Inventor: Harumi Kokaji, Hino, Japan

[73] Assignee: Ricoh Company, Ltd., Tokyo, Japan

[21] Appl. No.: 360,366

[22] Filed: Dec. 21, 1994

[30] Foreign Application Priority Data

Dec. 22, 1993 [JP] Japan .................................. 5-324233

[51] Int. Cl.$^6$ .......................... H04L 27/30; H04B 15/00; H04K 1/00
[52] U.S. Cl. .......................... 375/202; 375/346; 375/285
[58] Field of Search .................................. 375/206, 200, 375/202, 208, 346, 285

[56] References Cited

U.S. PATENT DOCUMENTS

| | | | |
|---|---|---|---|
| 5,128,957 | 7/1992 | Nakagawa | 375/208 |
| 5,216,691 | 6/1993 | Kaufmann | 375/206 |
| 5,280,499 | 1/1994 | Suzuki et al. | |
| 5,303,258 | 4/1994 | Nakamura . | |

OTHER PUBLICATIONS

"Method of using PLL-IC", published by Sangyo Shuppan, pp. 112-129.

Primary Examiner—Stephen Chin
Assistant Examiner—Hai H. Phan
Attorney, Agent, or Firm—Oblon, Spivak, McClelland, Maier & Neustadt, P.C.

[57] ABSTRACT

A clock rate modulation spread spectrum (CRM-SS) communication system is provided in which a bit error rate on a receiver side is minimized by controlling at least one of parameters defining a phase error. The CRM-SS communication system uses a delay locked loop comprising an $n\Delta$-type delay locked loop, where $0<n\leq 2$. A sum of a plurality of phase errors generated by different causes are calculated. A receiver and/or transmitter is controlled by varying one of parameters including a loop gain K and a linear region $n\Delta$ of the phase comparison characteristic of the delay locked loop, a modulation index $\beta$, a transmission rate fm, a transmission power P and a chip width $\Delta$, in accordance with the sum calculated by the calculating means so that a bit error rate in the receiver is minimized.

6 Claims, 17 Drawing Sheets

ERROR RATE CHARACTERISTIC(fm=9.6kbps, $\beta$ =1)

FIG. 5 step 1
K : CONSTANT step 2
RECEIVE TRAINING SIGNAL step 3
COMPARISON WITH KNOWN-PATTERN step 4
CALCULATE BIT ERROR RATE step 5
REFER TO RESULT OF SIMULATION step 6
DETERMINE S/N step 7
CALCULATE OPTIMUM LOOP GAIN step 8
GENERATE SIGNAL FOR CONTROLLING LOOP GAIN

ERROR RATE CHARACTERISTIC

ERROR RATE CHARACTERISTIC

FIG. 16 step 1
RECEIVE TRAINING SIGNAL step 2
COMPARE WITH KNOWN SIGNAL PATTERN step 3
CALCULATE BIT ERROR RATE step 4
REFER TO RESULT OF SIMULATION step 5
DETERMINE S/N

SPREAD SPECTRUM COMMUNICATION SYSTEM HAVING A MINIMIZED BIT ERROR RATE

BACKGROUND OF THE INVENTION

The present invention generally relates to a spread spectrum communication system, and more particularly to a spread spectrum communication system having a minimized bit error rate so that a communication can be performed always in a preferable condition.

Generally, in a direct sequence spread spectrum communication system, a delay locked loop (DLL) is used as a tracking loop on a receiver side. The DLL assumes a delay in a pseudonoise (PN) signal, and generates a control signal having a variable polarization corresponding to a lead or a lag in an assumed value. The DLL corresponds to a phase locked loop (PLL) used for demodulating a frequency modulated (FM) signal. A typical DLL is known as a baseband DLL, a non-coherent DLL or a dithering loop. Normally, when these DLLs are used as a tracking loop, a loop gain of the DLL is, in most cases, fixed to a predetermined value.

Various design methods have been discussed for a communication system using the PLL as a tracking loop. Most of those discussions are related to how to eliminate a steady-state phase error or a tracking error. However, in a case where a demodulated signal is related to the steady-state phase error as is in a clock rate modulation spread spectrum (CRM-SS) communication system, it is not appropriate to design a communication system by using a design method in which the steady-state phase error is aimed to be merely reduced.

As a known document describing prior art related to the present invention, there is a publication titled "Method of using PLL-IC" (published by Sangyo Shuppan, pages 112–124, Chapter VII, Feb., 10, 1986). This publication describes optimum designs of the PLL in accordance with their objects for use. However, this publication does not describe a design in which the DLL is used or a design in which a phase error defined by a sum of the steady-state error and the tracking error is used.

FIG. 1A is a block diagram of an example of a transmitter of a conventional CRM-SS communication system; FIG. 1B is a block diagram of an example of a receiver of the conventional CRM-SS system.

In the transmitter shown in FIG. 1A, a clock signal generated by a voltage controlled oscillator 1 is frequency modulated by an information signal supplied thereto, and then a PN signal is generated in a pseudonoise generator (PNG) 2 in accordance with the modulated clock signal supplied by the voltage controlled oscillator 1. The PN signal is output to a radio-frequency (RF) unit 3 so as to be transmitted by means of a carrier wave via an antenna 4.

In the receiver shown in FIG. 1B, the carrier wave (PN signal) is received by a front end unit 6 via an antenna 5. The front end unit 6 demodulates the carrier wave to obtain the PN signal. The PN signal is split by a correlation network 7. A reference PN signal generator 11 generates two reference PN signals, one having a lead and the other having a lag. The reference PN signals are input to the correlation network 7. In the correlation network 7, each of the reference PN signals is multiplied by the split PN signal, and the difference between the two products is output as an error signal to an amplifier 8. The error signal is amplified by the amplifier 8 and smoothed by a loop filter 9, and then supplied to a voltage controlled oscillator 10 to generate a clock signal to be supplied to the reference PN signal generator 11. A demodulated signal is obtained as an output of the loop filter 9.

In the above-mentioned conventional CRM-SS communication system using the DLL on a receiver side, there is a problem in that an attempt to reduce a bit error for a conventional PLL system cannot be applied because the DLL inherently uses a phase difference, and thus the bit error cannot be reduced by merely reducing the phase error in a simple manner.

SUMMARY OF THE INVENTION

It is a general object of the present invention to provide a clock rate modulation spread spectrum communication system in which the above-mentioned problems are eliminated.

A more specific object of the present invention is to provide a clock rate modulation spread spectrum communication system in which a bit error rate on a receiver side is minimized by controlling a loop gain of a DLL of a receiver in accordance with a quantified feature representing a tracking state of the DLL of the receiver, an error rate of a demodulated signal or a quantified feature representing an intensity of a reception signal.

Another object of the present invention is to provide a clock rate modulation spread spectrum communication system in which a bit error rate on a receiver side is minimized by controlling a modulation index of a transmitter in accordance with a quantified feature representing a tracking state of a DLL of a receiver, an error rate of a demodulated signal or a quantified feature representing an intensity of a reception signal.

Another object of the present invention is to provide a clock rate modulation spread spectrum communication system in which a bit error rate on a receiver side is minimized by controlling at least one of parameters defining a phase error.

In order to achieve the above-mentioned objects, there is provided according to one aspect of the present invention a clock rate modulation spread spectrum communication system having a transmitter and a receiver, the transmitter modulating a clock signal of a pseudonoise signal according to an information signal, the receiver having a delay locked loop for tracking a synchronization, the receiver demodulating the information signal received from the transmitter by using tracking control signals of the delay locked loop, the receiver comprising:

a quantified feature extracting unit for extracting a quantified feature representing a state of an occurrence of a bit error in the receiver; and a controlling unit for controlling a loop gain of said delay locked loop in accordance with the quantified feature extracted by said quantified feature extracting unit at a communication start time or during a communication so that a bit error rate of the receiver is minimized.

There is provided according to another aspect of the present invention a clock rate modulation spread spectrum communication system having a transmitter and a receiver, the transmitter modulating a clock signal of a pseudonoise signal according to an information signal, the receiver having a delay locked loop for tracking a synchronization, the receiver demodulating the information signal received from the transmitter by using tracking control signals of the delay locked loop, the receiver comprising:
 a quantified feature extracting unit for extracting a quantified feature representing a state of an occurrence of a bit error in the receiver; and
 a transmitting unit for transmitting the quantified feature extracted by the quantified feature extracting unit to the transmitter, and the transmitter comprising:
 a receiving unit for receiving the quantified feature transmitted by the receiver; and
 a controlling unit for controlling a modulation index used by the transmitter in accordance with the quantified feature received from the receiver at a communication start time or during a communication so that a bit error rate of the receiver is minimized.

There is provided according to another aspect of the present invention a clock rate modulation spread spectrum communication system having a transmitter and a receiver, the transmitter modulating a clock signal of a pseudonoise signal according to an information signal, the receiver having a delay locked loop for tracking a synchronization, the receiver demodulating the information signal received from the transmitter by using tracking control signals of the delay locked loop, the clock rate modulation spread spectrum communication system comprising:

calculating means for calculating a sum of a plurality of phase errors generated by different causes; and controlling means for controlling the receiver and/or the transmitter in accordance with the sum calculated by the calculating means so that a bit error rate in the receiver is minimized.

Other objects, features and advantages of the present invention will become more apparent from the following detailed description when read in conjunction with the accompanying drawings.

BRIEF DESCRIPTION OF THE DRAWINGS

FIG. 5 is a flow chart of a controlling operation of a loop gain performed in the receiver shown in FIG. 4;

FIG. 16 is a flow chart of a determining operation of an S/N ratio performed in the receiver shown in FIG. 15B;

DETAILED DESCRIPTION OF THE PREFERRED EMBODIMENTS

Figure 2:
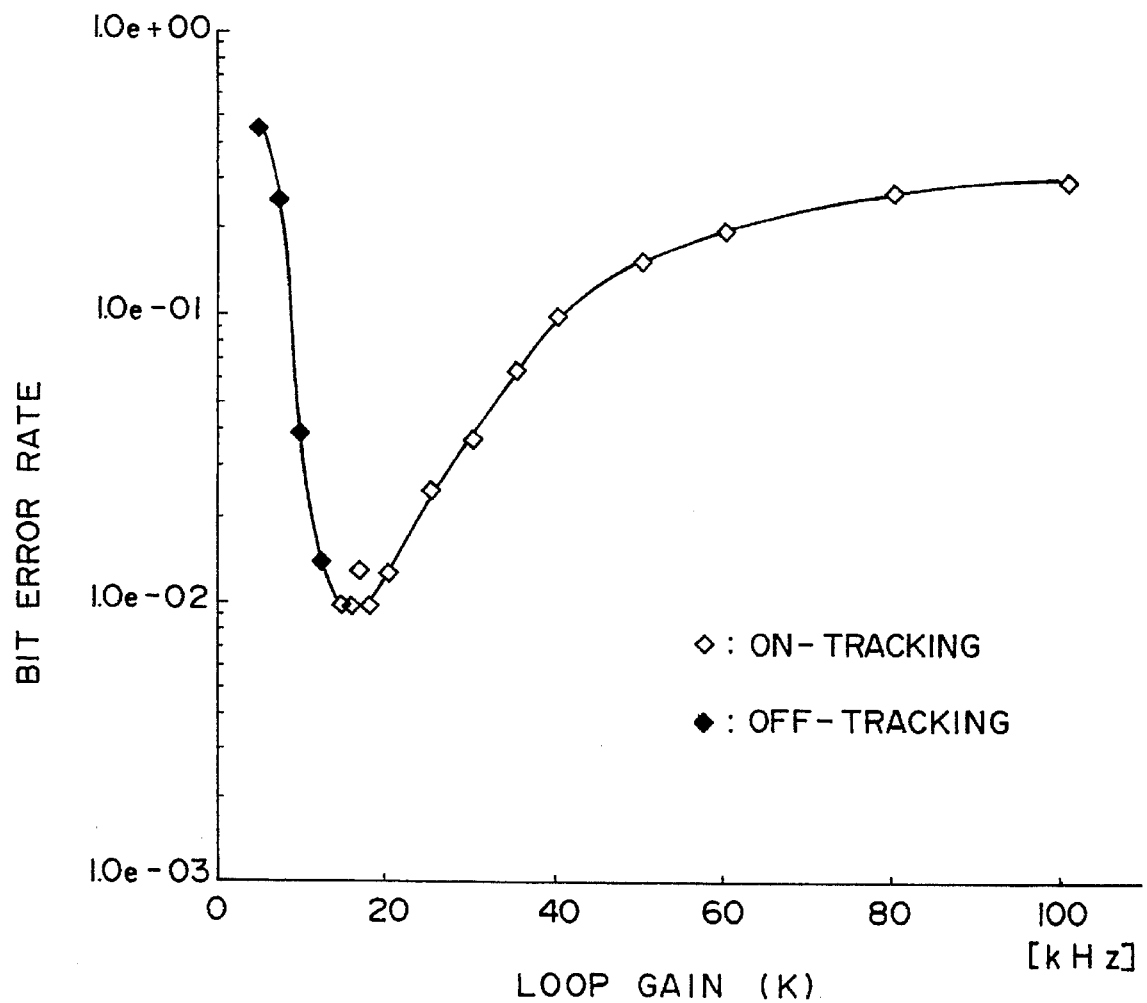
FIG. 2 is a graph showing an error rate characteristic of the conventional CRM-SS communication system shown in FIG. 1 obtained by means of simulation.

FIG. 2 is a graph showing an error rate characteristic in a conventional CRM-SS communication system obtained by means of a simulation. In the graph shown in FIG. 2, a loop gain of a DLL is used as a parameter, and various bit error rates for various loop gains are plotted. According to the graph shown in FIG. 2, there is a loop gain at which the bit error rate indicates a minimum value. It is also apparent from the graph that the bit error rate is rapidly increased as it goes away from the minimum point. Accordingly, in the CRM-SS communication system, it is very important to establish a design which provides each parameter minimizing the bit error rate.

The following table shows elements used for performing the simulation to obtain the graph shown in FIG. 2.

TABLE 1

Elements of Simulation

| | |
|---|---|
| Transmitter | |
| PN Code | Maximal Sequence Code length 127 |
| Transmission Rate | 9.6 Kbps |
| Modulation Index | 1 |
| Receiver | |
| Loop Gain | 5–200 KHz |
| DLL | 2Δ-Type |
| Loop Filter | Lag Filter |
| Transmission Line | |
| S/N Ratio | −10 dB |

According to FIG. 2, it is understood that there is a value of the loop gain at which a value of the bit error rate is minimized. It is also understood from the graph that a value of the bit error rate rapidly increases as it goes away from the minimum point. Accordingly, it is important to control the loop gain to be at the most appropriate value.

Generally, a design for a transmitter and a receiver is performed so that a tracking error of a tracking circuit is minimized. However, in the CRM-SS communication system, since a steady-state phase error is related to a modulation index, it is appropriate to use a sum of the steady-state phase error and the tracking error.

A description will now be given of an example of an optimum design of a CRM-SS communication system in which a 2Δ-type DLL is used in a receiver.

Since the steady-state phase error, when a frequency is shifted stepwise from a center frequency, is $\Delta\omega/K$ [rad], the following expression is obtained by converting it with respect to a time by using a chip width $\Delta$ of the PN signal.

$$\frac{\Delta\omega}{K} \cdot \frac{\Delta}{2\pi} = \frac{\Delta f}{K} \Delta \quad (1)$$

where $\Delta f$ is a necessary bandwidth when a frequency modulation is applied. The bandwidth $\Delta f$ is given by $\Delta f = \beta fm$, where $\beta$ is a modulation index and $fm$ is an information transmission rate.

The tracking error $\sigma_{2\Delta}$ is expressed by the following expression. In this example, an effect of a self noise is ignored.

$$\sigma_{2\Delta} = \Delta \sqrt{\frac{2B_L N_0}{P}} \quad (2)$$

where $B_L$ is a noise bandwidth of a one-side loop, $P$ is a signal power and $N_0/2$ is a power spectrum density of noise.

A phase error $\zeta_{2\Delta}$ which can be an index of design is obtained by summing the steady-state phase error and the tracking error as expressed below.

$$\tau_{2\Delta} = \frac{\Delta f}{K} \Delta + \sigma_{2\Delta} \quad (3)$$

When a lag-type filter is used for the loop filter, $\sigma_{2\Delta}$ is given by the following expression.

$$\sigma_{2\Delta} = \Delta \sqrt{\frac{K\Delta}{2} 10^{-\frac{\gamma}{10}}} \quad (4)$$

In the expression (4), a sound to noise (S/N) ratio $\gamma$ [dB] is used.

As a result of a calculation using the above-mentioned expression (3) with respect to a loop gain at which the bit error rate shown in FIG. 2 is minimized, it is found that the bit error rate is minimized when a value of a ratio $r = \zeta_{2\Delta}/\Delta$ falls within a range from 0.55 to 0.85 ($\gamma$=0.55 ~0.85). When values of other elements in the above table 1, such as the modulation index and the information transmission rate, are varied, a value of the loop gain at which the bit error rate is minimized is also varied, however, as long as the expression (3) is concerned, a value of falls within a range from 0.55 to 0.85, as shown in the following Table 2.

TABLE 2

| DLL | Trans. Rate | Recep. S/N | Modu. Index | Optimum Loop Gain | Ratio r |
|---|---|---|---|---|---|
| 2Δ-type | 9.6 Kbps | −10 dB | 1 | 12.5–22 KHz | 0.55–0.85 |
| | | | 2 | 32.5–40 KHz | 0.63–0.73 |
| | | −5 dB | 1 | 15–20 KHz | 0.55–0.69 |
| | 19.2 Kbps | −10 dB | 1 | 25–40 KHz | 0.56–0.83 |

Accordingly, in a case that a 2Δ-type DLL is used in a receiver side, it is understood that when the ratio of the sum of the steady-state phase error and the tracking error to the chip width falls within a range from 0.55 to 0.85, a minimum value of the bit error rate can be obtained.

When an nΔ-type DLL (0<n≦2) is used in a synchronous circuit of a receiver side, a phase error $\zeta_{n\Delta}$, which can be an index of design, is defined by a sum of the steady-state phase error and a tracking error $\sigma_{n\Delta}$ as expressed below.

$$\tau_{n\Delta} = \frac{\Delta f}{K} \Delta + \sigma_{n\Delta} \quad (5)$$

It is assumed that r is a ratio of the phase error $\zeta_{n\Delta}$ to a value $n\Delta$ of a linear range in a phase comparison characteristic of the nΔ-type DLL, as expressed below.

$$r = \frac{\tau_{n\Delta}}{(n\Delta/2)} \quad (6)$$

A value of r calculated for the phase error $\zeta_\Delta$, each parameter of which minimizes the bit error rate, falls within a range from 0.55 to 0.85. At this time, a self noise is ignored for the tracking error on the assumption that the DLL has already acquired a synchronization and is in a tracking operation, and thus the tracking error $\sigma_{n\Delta}$ is expressed by the following expression.

$$\sigma_{n\Delta} = \frac{n}{2} \Delta \sqrt{\frac{2 B_L N_0}{P}} = \frac{n}{2} \Delta \sqrt{\frac{K\Delta}{2} 10^{-\frac{\gamma}{10}}} \quad (7)$$

Using the expression (7), the phase error is expressed by the following expression.

$$\tau_{n\Delta} = \frac{\Delta f}{K} \Delta + \frac{n}{2} \Delta \sqrt{\frac{K\Delta}{2} 10^{-\frac{\gamma}{10}}} \quad (8)$$

As mentioned above, a CRM-SS communication system having a minimized bit error rate can be obtained by determining parameters of a transmitter and/or receiver so that a value of the above-mentioned ratio r falls within a range from 0.55 to 0.85.

It should be noted that the steady-state phase error and the tracking error used for obtaining the phase error are not limited to the specifically described expressions, and other expressions may be used within the scope of the present invention.

Figure 3:
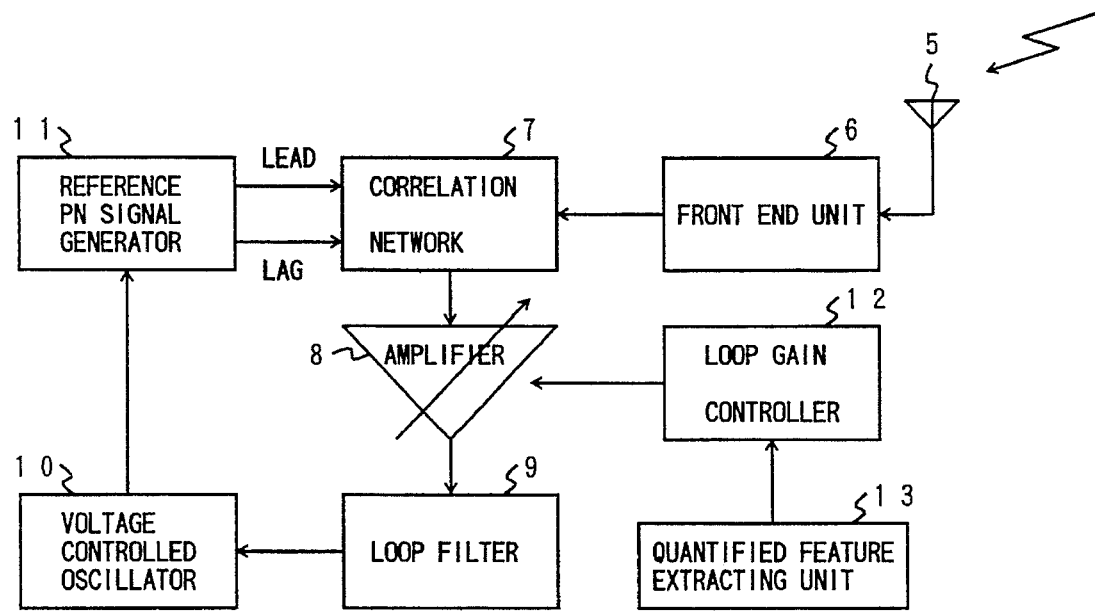
FIG. 3 is a block diagram of a receiver of a first embodiment of a CRM-SS communication system according to the present invention.

A description will now be given, with reference to FIG. 3, of a first embodiment of a CRM-SS communication system according to the present invention. FIG. 3 is a block diagram of a receiver used in the first embodiment according to the present invention. In FIG. 3, parts that are the same as the parts shown in FIG. 1B are given the same reference numerals, and descriptions thereof will be omitted.

The receiver of the first embodiment shown in FIG. 3 comprises a loop gain controller 12 and a quantified feature extracting unit 13. The quantified feature extracting unit 13 extracts a quantified feature represented by a phase error, a S/N ratio of a transmission line or an off-tracking. The loop gain controller 12 controls a value of a loop gain K in accordance with the quantified feature supplied by the quantified feature extracting unit 13 so that the bit error rate is minimized.

The front end unit 6 has a function to maintain a power P of a reception signal to a constant level. The loop gain K can be represented by the power P of the reception signal, sensitivity $K_{VCC}$ of the voltage controlled oscillator 10 and a gain A of the amplifier 8, that is, $K=A(\sqrt{P})K_{VCC}$.

As apparent from the expression (8), since $\Delta f$, $\Delta$ and n are known parameters, the ratio r can be maintained at an optimum value (0.55 to 0.85) by controlling the loop gain K according to the S/N ratio γ of the reception signal.

Figure 4:
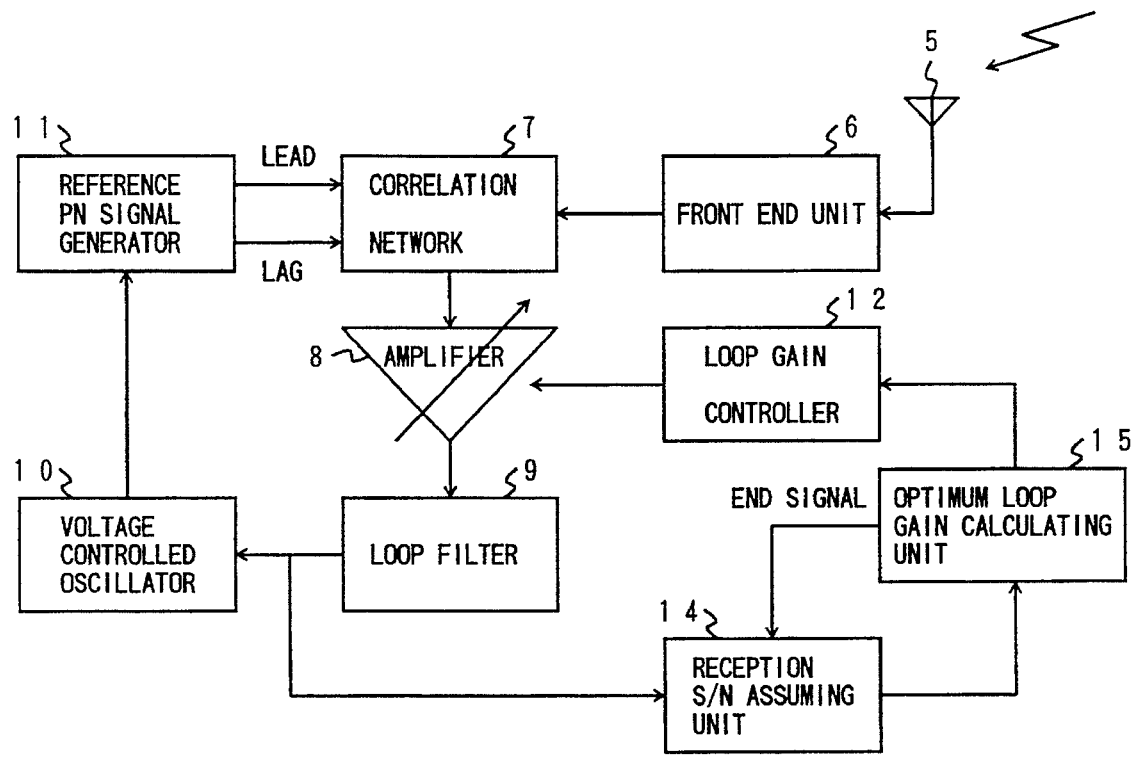
FIG. 4 is a block diagram of a receiver of a second embodiment of a CRM-SS communication system according to the present invention.

A description will now be given, with reference to FIG. 4, of a second embodiment according to the present invention. FIG. 4 is a block diagram of a receiver of the second embodiment according to the present invention.

The receiver shown in FIG. 4 comprises a demodulation unit the same as that of the first embodiment, a reception S/N assuming unit 14, an optimum loop gain calculating unit 15 and the loop gain controlling unit 12. The optimum loop gain calculating unit 15 calculates an optimum value for the loop gain in accordance with a value of the reception S/N.

Figure 6:
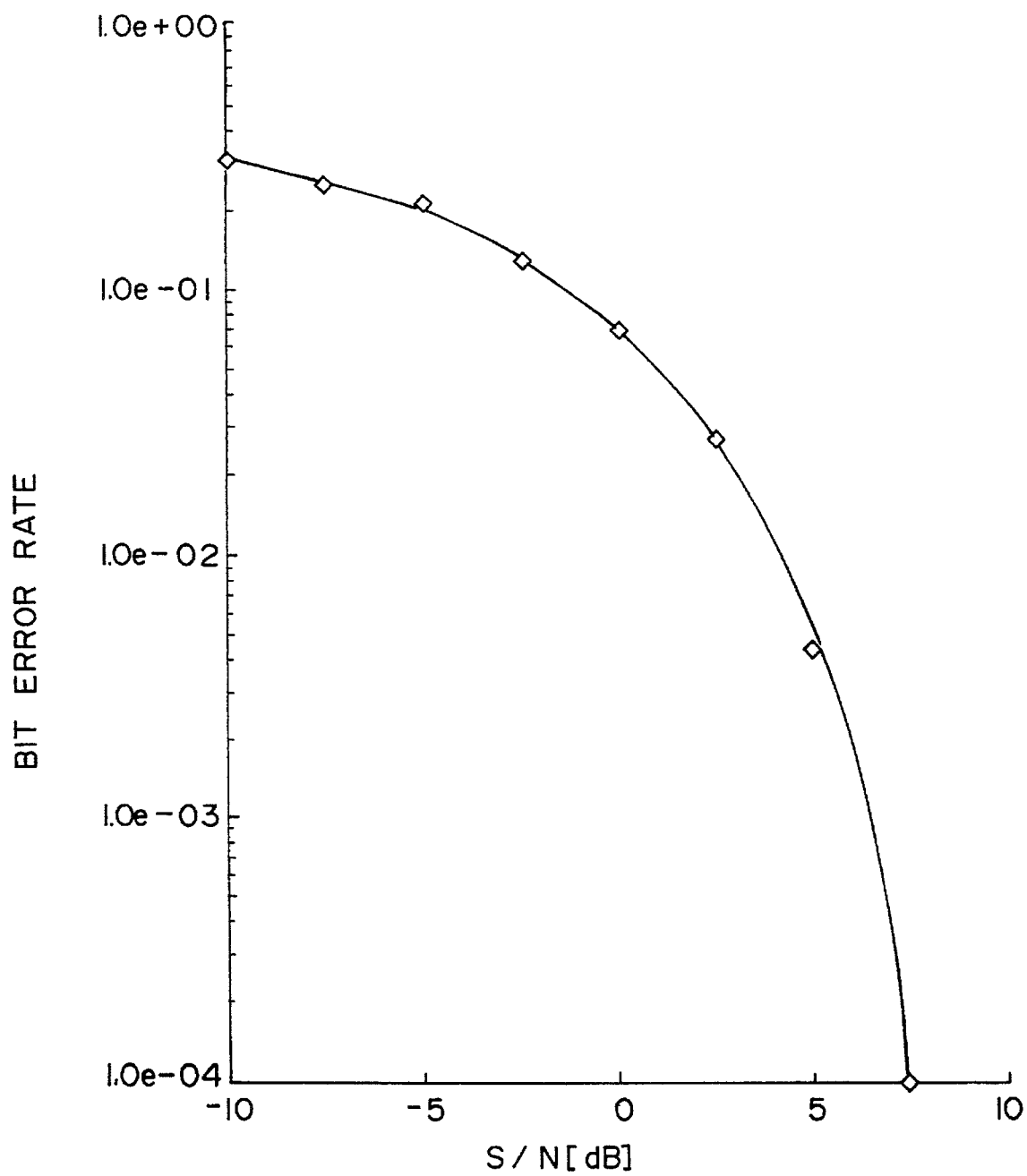
FIG. 6 is a graph showing an error rate characteristic of the CRM-SS communication system shown in FIG. 4.

FIG. 5 is a flow chart of a controlling process of the loop gain performed by the receiver shown in FIG. 4. When a communication is started, the receiver sets, in step 1, the loop gain K at a constant level. The receiver receives, in step 2, a training signal having a predetermined signal pattern. The training pattern is compared, in step 3, with a predetermined signal pattern stored in the receiver, and then a bit error rate is calculated in step 4. A value of the S/N is assumed by the reception S/N assuming unit 14, in steps 5 and 6, by referring to an error rate characteristic shown in FIG. 6.

The following expression is obtained by solving the expression (8) with respect to the loop gain K.

$$\frac{A}{2} \cdot 10^{\frac{-\gamma}{10}} K^3 - \tau^2 K^2 + \frac{4}{n} \tau \Delta f K - \frac{4}{n^2} (\Delta f)^2 = 0 \quad (9)$$

In the expression (9), r is a parameter defined by the ratio of a phase error ζ to a linear region nΔ of a phase comparison characteristic of an nΔ-type DLL. The ratio r falls within a range from 0.55 to 0.85 when the bit error rate is minimized.

The optimum loop gain calculating unit 15 calculates, in step 7, an optimum value of the loop gain K using the expression (9) with the value of the S/N assumed by the reception S/N assuming unit 14 and a value of the ratio r which is from 0.55 to 0.85. Thereafter, the optimum loop gain calculating unit 15 sends an end signal to the reception S/N assuming unit 14 to stop the assuming operation of the S/N.

The loop gain controller 12 then generates, in step 8, a control signal by which a value of the loop gain K is set to the optimum value of the loop gain calculated by the optimum loop gain calculating unit 15. The control signal is supplied to the amplifier 8.

Figure 7:
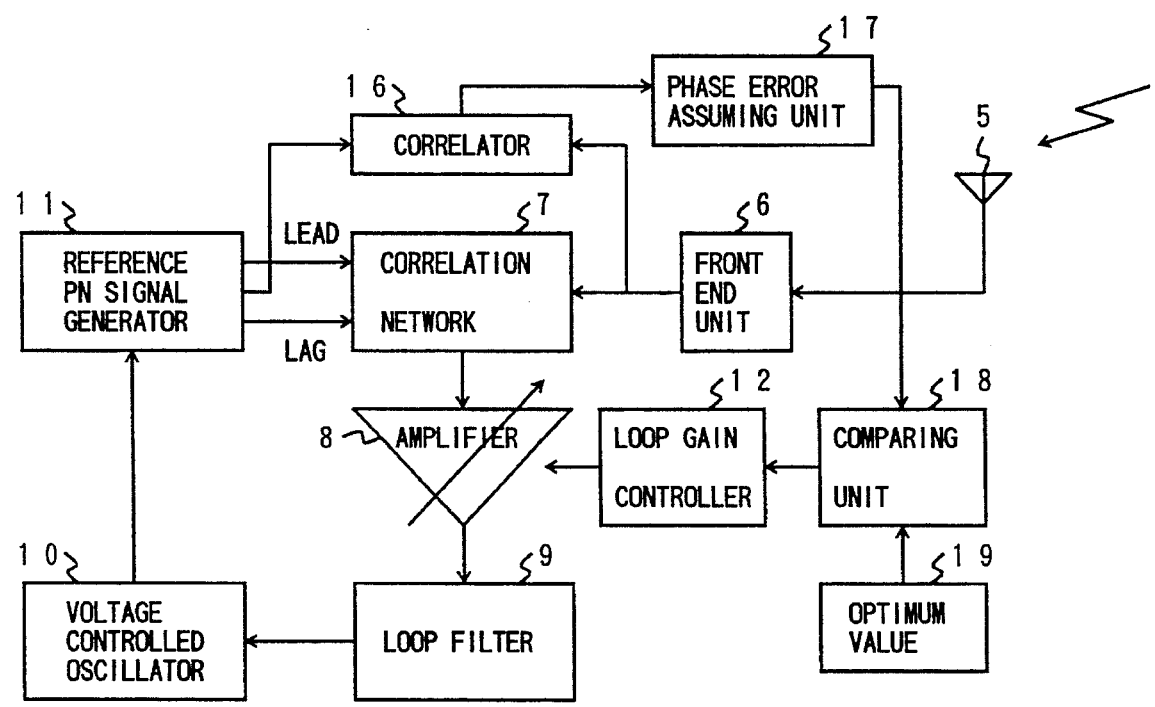
FIG. 7 is a block diagram of a receiver of a third embodiment of a CRM-SS communication system according to the present invention.

A description will now be given, with reference to FIG. 7, of a third embodiment according to the present invention. FIG. 7 is a block diagram of a receiver of the third embodiment according to the present invention. In FIG. 7, parts that are the same as the parts shown in FIG. 3 are given the same reference numerals, and descriptions thereof will be omitted.

The receiver shown in FIG. 7 comprises a demodulation unit the same as that of the first embodiment, a correlator 16, a phase error assuming unit 17, a comparing unit 18 and the loop gain controller 12. A reference numeral 19 indicates an optimum value supplied to the comparing unit 18.

Figure 8:
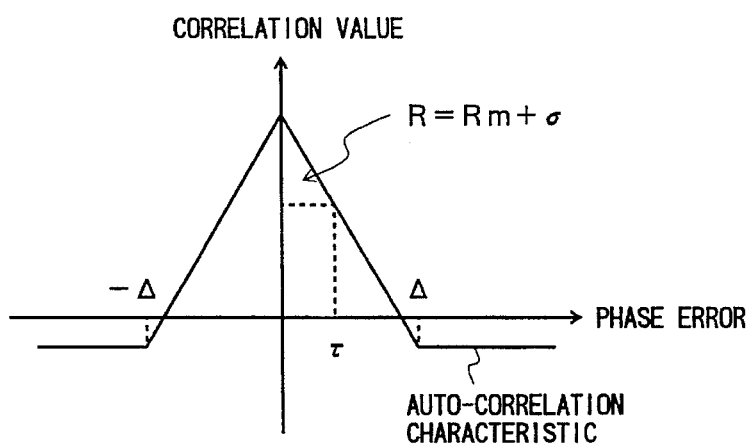
FIG. 8 is a graph showing an auto-correlation characteristic of the CRM-SS communication system shown in FIG. 7.

The correlator 16 calculates correlation values between the received PN signal and the reference PN signals, and calculates a mean value $R_m$ and a dispersion σ of the correlation values. The phase error assuming unit 17 determines a phase error corresponding to a sum R of the mean value $R_m$ and the dispersion σ in accordance an autocorrelation characteristic shown in FIG. 8.

The comparing unit 18 calculates the parameter r determined by the determined phase error and a linear region nΔ of a phase comparison characteristics of the DLL, that is, r=ζ/(nΔ/2), and determines whether or not the result falls within a range of the optimum value from 0.55 to 0.85. If the result does not fall within the range of the optimum value, the comparing unit 18 sends a signal to the loop gain controller 12 so as to control a value of the loop gain so that the parameter r falls within the optimum range.

Figure 9:
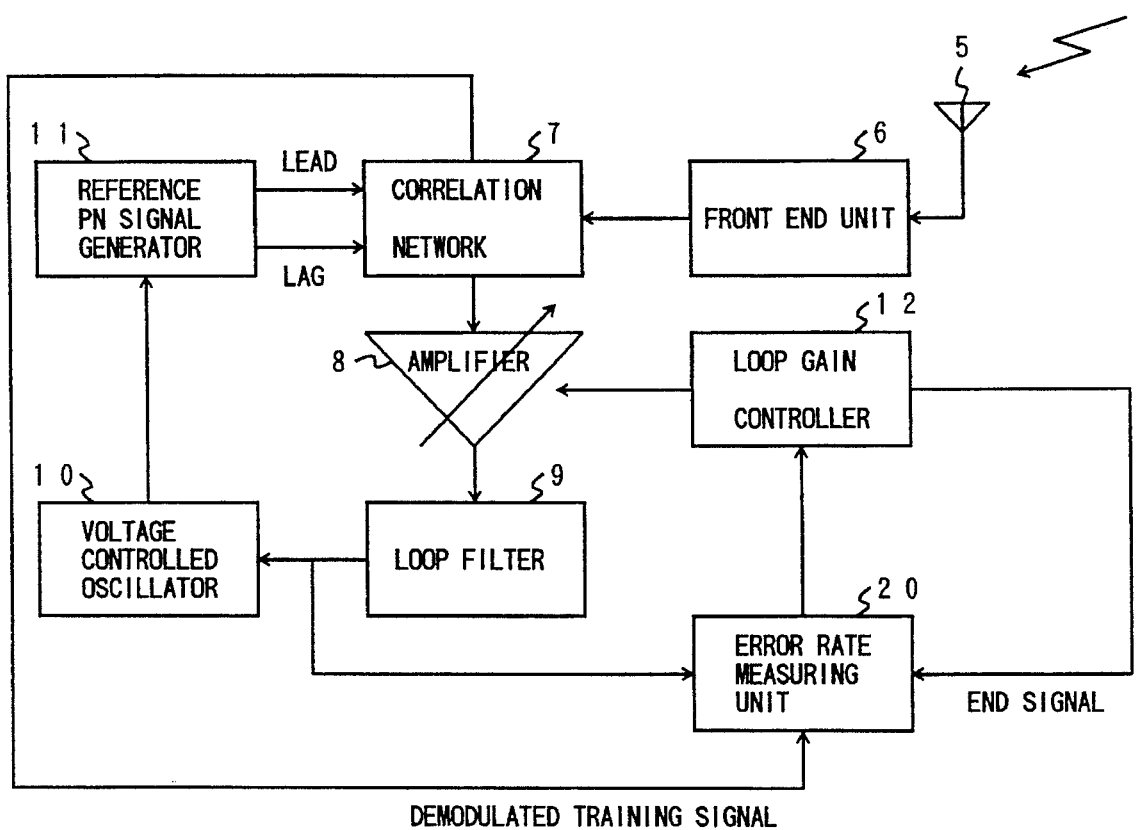
FIG. 9 is a block diagram of a receiver of a fourth embodiment of a CRM-SS communication system according to the present invention.

A description will now be given, with reference to FIG. 9, of a fourth embodiment according to the present invention. FIG. 9 is a block diagram of a receiver of the fourth embodiment according to the present invention. In FIG. 9, parts that are the same as the parts shown in FIG. 3 are given the same reference numerals, and descriptions thereof will be omitted.

The receiver shown in FIG. 9 comprises a demodulation unit the same as that of the first embodiment, an error rate measuring unit 20 and the loop gain controller 12. The demodulation unit receives and demodulates a training signal after a synchronization is acquired, the training signal having a predetermined signal pattern. The error rate measuring unit 20 measures the bit error by comparing a signal pattern of the demodulated training signal with the predetermined signal pattern. This measurement is performed by varying a value of the loop gain. The training signal transmitted by the transmitter has a signal length sufficient for measuring the bit error rate by varying a value of the loop gain.

The loop gain controller 12 determines an optimum value of the loop gain which minimizes the bit error rate in accordance with the result of a measurement performed by using the loop gain as a parameter, and controls the value of the loop gain of DLL to maintain the optimum value. After the loop gain is set to the optimum value, the loop gain controller 12 sends an end signal to the error rate measuring unit 20 so as to stop an operation of the error rate measuring unit 20.

In this embodiment, a controlling operation of the bit error rate is performed in an initial procedure, when a communication is started. However, the training signal may be transmitted from the transmitter every time after a predetermined time has elapsed or a predetermined amount of data has been sent so that the optimum value of the loop gain is always controlled during the communication.

Figure 10:
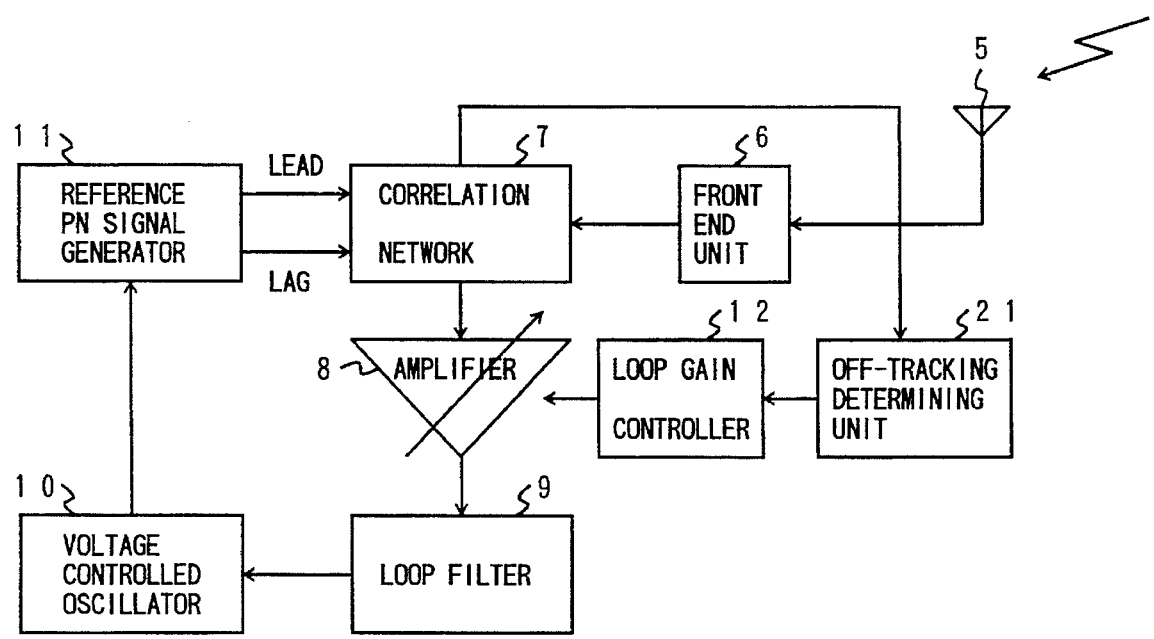
FIG. 10 is a block diagram of a receiver of a fifth embodiment of a CRM-SS communication system according to the present invention.

A description will now be given, with reference to FIG. 10, of a fifth embodiment according to the present invention. FIG. 10 is a block diagram of a receiver of the fifth embodiment according to the present invention. In FIG. 7, parts that are the same as the parts shown in FIG. 3 are given the same reference numerals, and descriptions thereof will be omitted.

A cause for an increase of the bit error rate when a value of the loop gain is less than an optimum value is due to an off-tracking. In the simulation for obtaining the graph shown in FIG. 2, the bit error rate due to the off-tracking is distinguished, and is indicated in the graph. In this embodiment, the loop gain is controlled by detecting the off-tracking.

The receiver shown in FIG. 10 comprises a demodulation unit the same as that of the first embodiment, an off-tracking determining unit 21 and the loop gain controller 12. The off-tracking determining unit 21 uses, for example, a correlation characteristic of the PN signal. A detection of the off-tracking for a 1Δ-type DLL will be described below.

Figure 11:
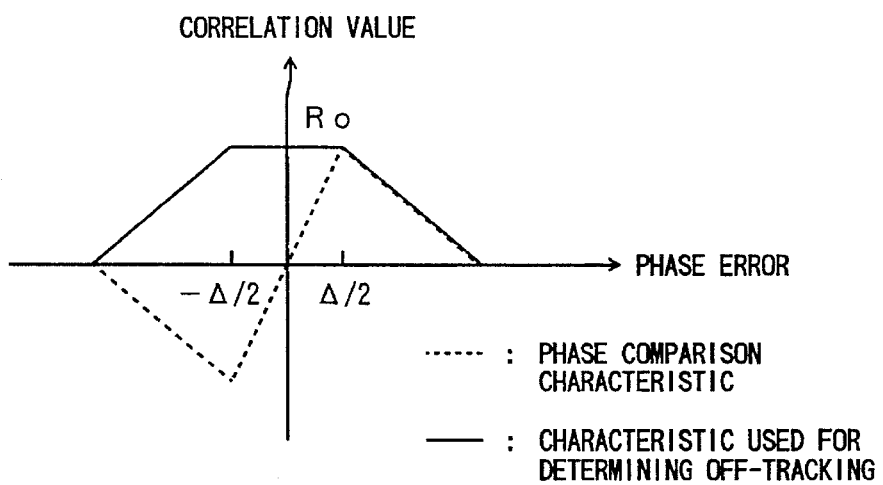
FIG. 11 is a graph showing a correlation characteristics of a PN signal of the CRM-SS communication system shown in FIG. 10.

In the receiver shown in FIG. 10, the carrier wave (PN signal) of a training signal is received by the front end unit 6 via the antenna 5. The front end unit 6 demodulates the carrier wave to obtain the PN signal. The PN signal is split by the correlation network 7. The reference PN signal generator 11 generates two reference PN signals, one having a lead Δ/2 and the other having a lag Δ/2. The reference PN signals are input to the correlation network 7. In the correlation network 7, each of the reference PN signals is multiplied by either one of the split PN signals, and a sum R of the two products is output to the 1 amplifier 8. The sum R is a constant value $R_0$, as shown in FIG. 11, in a region $|\zeta| \leq \Delta/2$ of the phase comparison characteristics of the 1Δ-type DLL in which tracking is well performed. If the sum R of the correlation value is less than $R_0$, the phase error $|\zeta| > \Delta/2$. In this condition, an exact demodulation of the signal is not performed, and thus an off-tracking tends to occur. Accordingly, it is determined that a tracking is well performed when R is equal to $R_0$, and that an off-tracking occurs when R is less than $R_0$.

Figure 12:
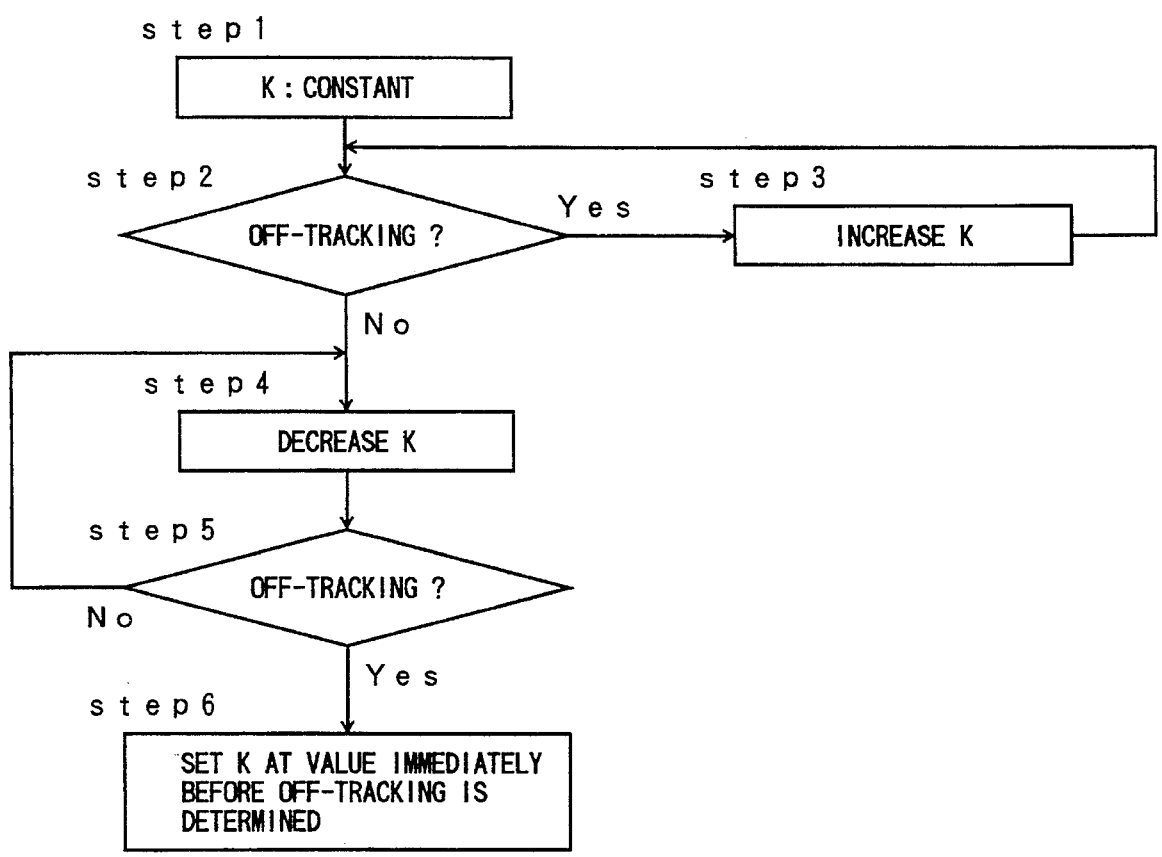
FIG. 12 is a flow chart of a controlling operation of a loop gain performed in the receiver shown in FIG. 10.

FIG. 12 is a flow chart of a controlling operation of the loop gain in this embodiment. First, the loop gain K is set, in step 1, to a constant value. It is determined, in step 2, whether or not an off-tracking has occurred. If it is determined that the off-tracking has occurred, the value of the loop gain K is increased, in step 3, so as to acquire a synchronization. After the synchronization has been acquired, the loop gain K is gradually reduced, in step 4, until an off-tracking occurs. When it is determined, in step 5, that an off-tracking has occurred, the routine proceeds to step 6 where a value of the loop gain K is set to a value immediately before the off-tracking occurred.

The controlling operation of the loop gain K can be performed in the same manner as that of the above-mentioned fourth embodiment. That is, the controlling operation can be performed while a training signal transmitted by the transmitter is being received. In this case, the training signal is transmitted for a duration sufficient for performing the controlling operation. The training signal may be transmitted from the transmitter every time after a predetermined time has elapsed or a predetermined amount of data has been sent so that the optimum value of the loop gain is always controlled during a communication. Additionally, the determination of the off-tracking and the controlling operation of the loop gain may be performed based on an information signal instead of using the training signal.

In the above-mentioned first through fifth embodiments, the bit error rate is minimized by controlling the loop gain at an optimum value on the receiver side. However, the bit error rate may be minimized by controlling other parameters in the above-mentioned expression (8), such as a linear region nΔ of the phase comparison characteristic on the receiver side.

The embodiments according to the present invention described below are related to a CRM-SS communication system in which a modulation index is controlled on a transmitter side so as to minimize the bit error rate on the receiver side.

Figure 13:
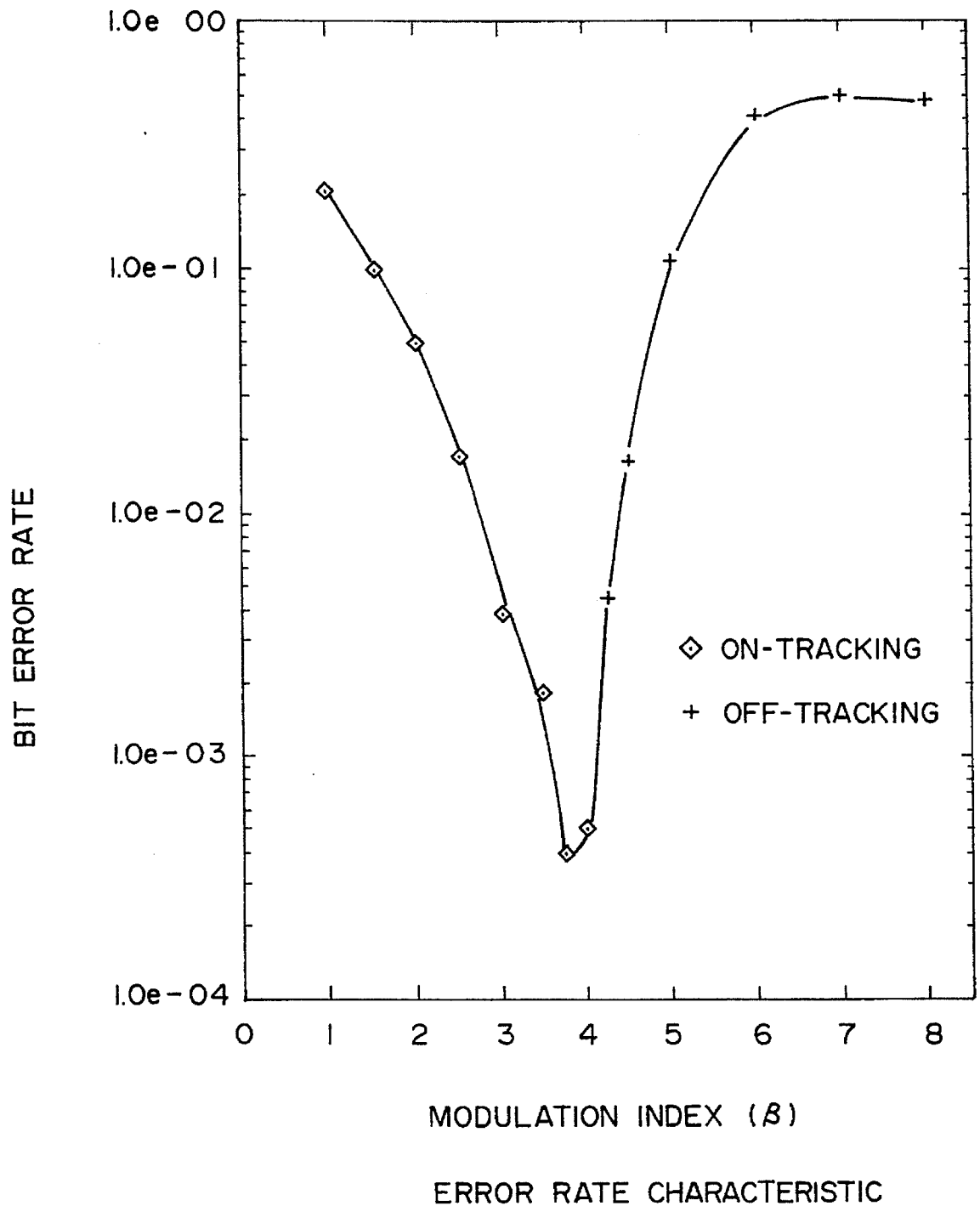
FIG. 13 is a graph of an error rate characteristic of the CRM-SS communication system shown in FIG. 1 obtained by means of simulation.

A description will now be given, with reference to FIG. 13, of a principle of the embodiments described in the following. FIG. 13 is a graph showing an error rate characteristic in a CRM-SS communication system obtained by means of a simulation. In the graph shown in FIG. 13, a modulation index of the DLL is used as a parameter, and various bit error rates for various modulation indexes are plotted. According to the graph shown in FIG. 13, there is a modulation index at which the bit error rate indicates a minimum value. It is also apparent from the graph that the bit error rate is rapidly increased as the value of the modulation index goes away from the minimum point.

The following table shows elements used in the simulation to obtain the graph shown in FIG. 2.

TABLE 3

Elements of Simulation

| Transmitter | |
| --- | --- |
| PN Code | Maximal Sequence Code length 127 |
| Transmission Rate | 9.6 Kbps |
| Modulation Index | 1 |
| Receiver | |
| Loop Gain | 100 KHz |
| DLL | 2Δ-Type |
| Loop Filter | Lag Filter |
| Transmission Line | |
| S/N Ratio | −5 dB |

According to FIG. 13, it is understood that there is a value of the modulation index at which a value of the bit error rate is minimized. It is also understood from the graph that a value of the bit error rate is rapidly increased as the value of the modulation index goes away from the minimum point. Accordingly, it is important to control the modulation index at the most appropriate value.

Figure 14A:
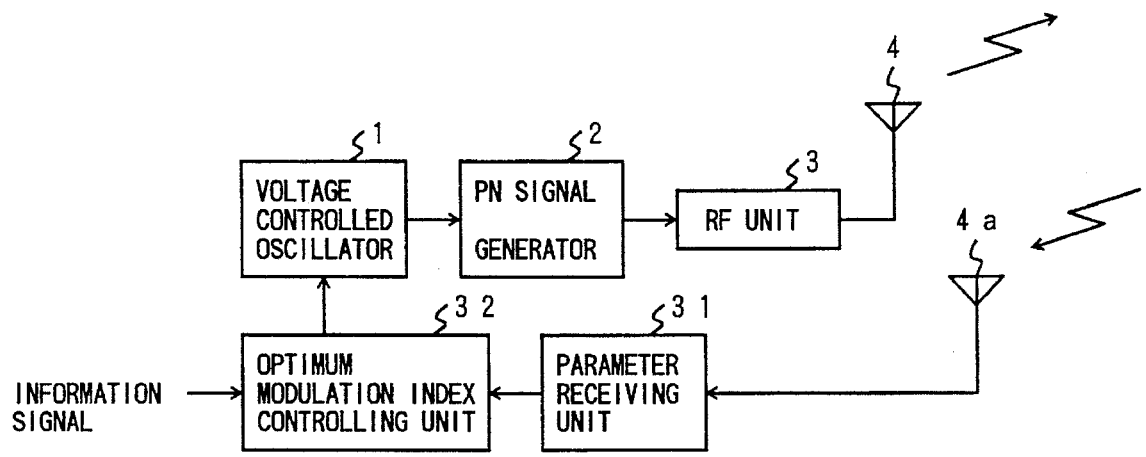
FIG. 14A is a block diagram of a transmitter of a sixth embodiment of a CRM-SS communication system according to the present invention.
Figure 14B:
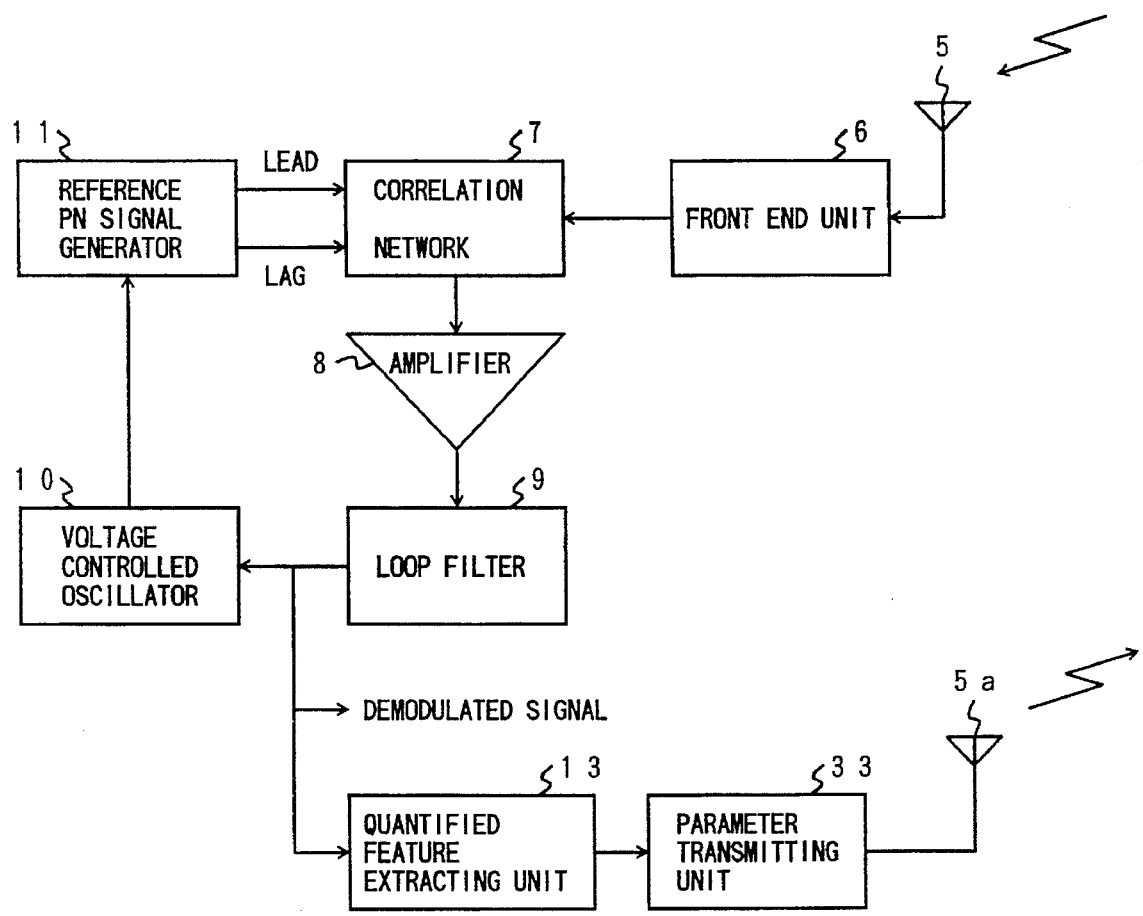
FIG. 14B is a block diagram of a receiver of the sixth embodiment of a CRM-SS communication system according to the present invention.

A description will now be given, with reference to FIGS. 14A and 14B, of a sixth embodiment according to the present invention. FIG. 14A is a block diagram of a transmitter of the sixth embodiment of a CRM-SS communication system according to the present invention; FIG. 14B is a block diagram of a receiver of the sixth embodiment. In FIGS. 14A and 14B, parts that are the same as the parts shown in FIGS. 1A and 1B are given the same reference numerals, and descriptions thereof will be omitted.

Figure 1A:
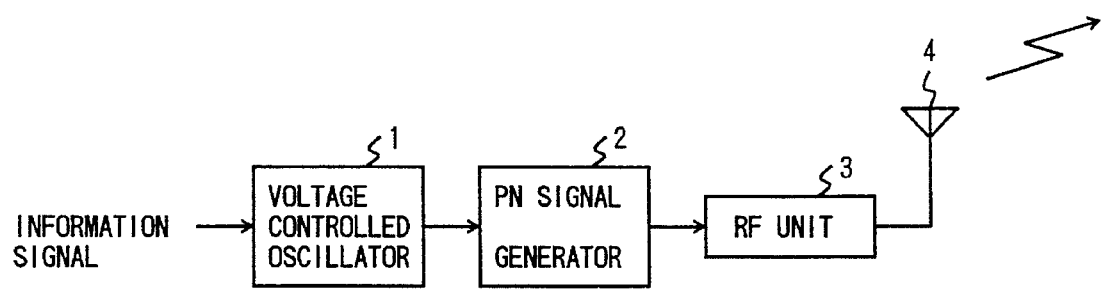
FIG. 1A is a block diagram of a transmitter of a conventional CRM-SS communication system.
Figure 1B:
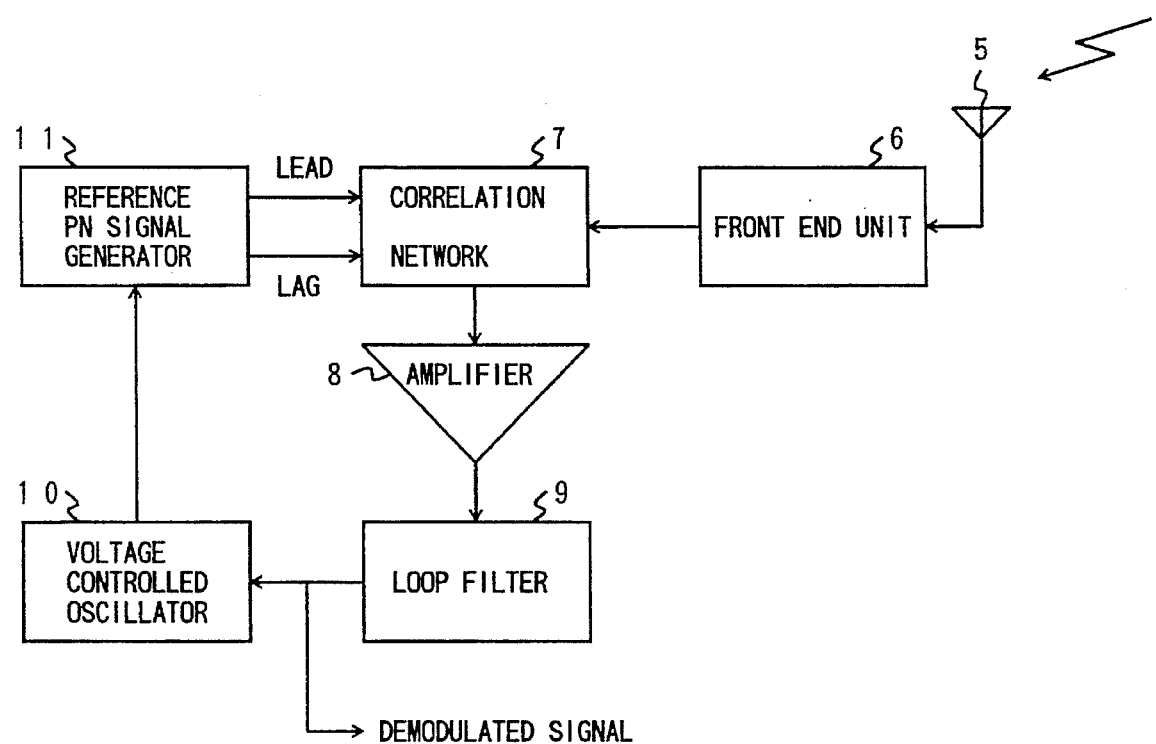
FIG. 1B is a block diagram of a receiver of the conventional CRM-SS communication system.

The transmitter shown in FIG. 14A comprises a modulation unit the same as that shown in FIG. 1A, a parameter receiving unit 31 and an optimum modulation index controlling unit 32. The parameter receiving unit 31 receives via the antenna 4a (the antenna 4a corresponds to the antenna 4) a value of a parameter calculated in accordance with a quantified feature in the receiver. The optimum modulation index controlling unit 32 controls the modulation index so that the bit error rate is minimized in accordance with the quantified feature such as a phase error, an S/N ratio of a transmission line or an off-tracking.

The receiver shown in FIG. 14B comprises the quantified feature extracting unit 13 described in the above-mentioned first embodiment and a parameter transmitting unit 33. The quantified feature extracting unit 13 extracts a quantified feature represented by a phase error, an S/N ratio of a transmission line or an off-tracking. The parameter transmitting unit 33 transmits a value of a parameter determined by the quantified feature extracting unit 13 via an antenna 5a (the antenna 5a corresponds to the antenna 5).

It should be noted that a phase shift keying (PSK) method, for example, is used for the parameter receiving unit 31 and the parameter transmitting unit 33.

In this embodiment, similarly to the above-mentioned first embodiment, the ratio r represented by the expression (6) is used as the quantified feature. As apparent from the expression (8), since $\Delta f$, fm, $\Delta$, K and n are known parameters, the ratio r can be maintained at an optimum value (0.55 to 0.85) by controlling the modulation index $\beta$ on the transmitter side according to the S/N ratio $\gamma$ of the reception signal.

Figure 15A:
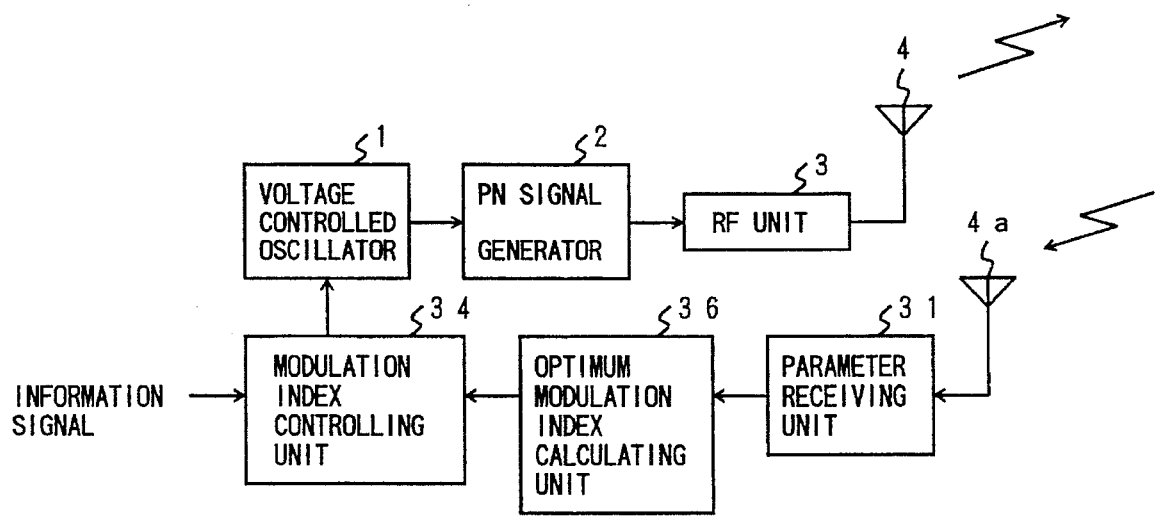
FIG. 15A is a block diagram of a transmitter of a seventh embodiment of a CRM-SS communication system according to the present invention.
Figure 15B:
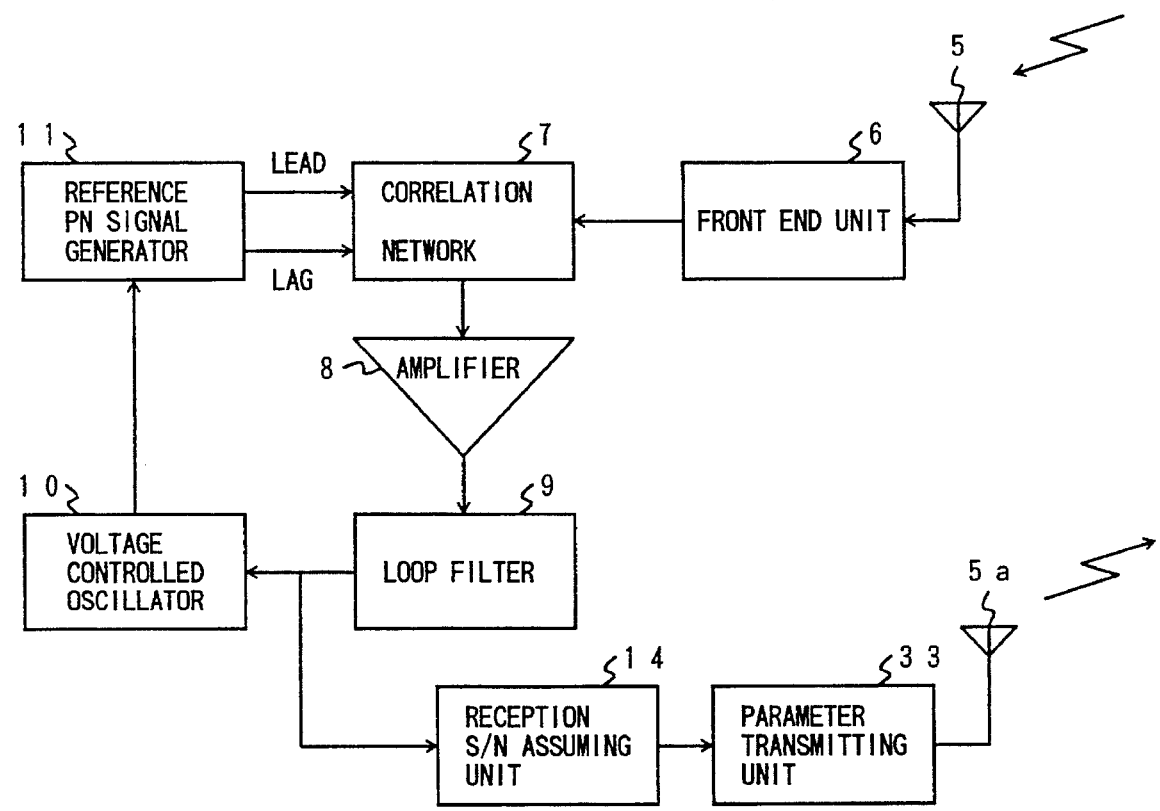
FIG. 15B is a block diagram of a receiver of the seventh embodiment of a CRM-SS communication system according to the present invention.

A description will now be given, with reference to FIGS. 15A and 15B, of a seventh embodiment according to the present invention. FIG. 15A is a block diagram of a transmitter of the seventh embodiment according to the present invention; FIG. 15B is a block diagram of a receiver of the seventh embodiment. In FIGS. 15A and 15B, parts that are the same as the parts shown in FIGS. 14A and 14B are given the same reference numerals, and descriptions thereof will be omitted.

The transmitter shown in FIG. 15A comprises a modulation unit the same as that of the sixth embodiment shown in FIG. 14A, a modulation index controlling unit 34, an optimum modulation index calculating unit 36 and the parameter receiving unit 31. The modulation index controlling unit 34 and the optimum modulation index calculating unit 36 together serve the same function as the optimum modulation index controlling unit 32 of the sixth embodiment shown in FIG. 14A.

The receiver shown in FIG. 15B comprises a demodulation unit the same as that of the sixth embodiment shown in FIG. 14B, the reception S/N assuming unit 14 and the parameter transmitting unit 33.

FIG. 16 is a flow chart of a controlling process of the modulation index performed by the transmitter shown in FIG. 15A. When a communication is started, similarly to the above-mentioned second embodiment, the demodulation unit in the receiver shown in FIG. 15A receives, in step 1, a training signal having a predetermined signal pattern. The training pattern is compared, in step 2, with a predetermined signal pattern stored in the receiver, and then, in step 3, a bit error rate is calculated. A value of the S/N is determined by the reception S/N assuming unit 14, in steps 4 and 5, by referring to the error rate characteristic shown in FIG. 6. The determined value of the S/N is then transmitted to the transmitter shown in FIG. 15A via the parameter transmitting unit 33 and the antenna 5a.

The parameter receiving unit 31 receives the determined value of the S/N transmitted by the receiver shown in FIG. 15A via the antenna 4a, and sends the value to the optimum modulation index calculating unit 36.

The following expression is obtained by solving the expression (8) with respect to the modulation index $\beta$.

$$\beta = \left( r - \sqrt{\frac{K\Delta}{2} 10^{-\frac{\gamma}{10}}} \right) \frac{nK}{2f_m} \quad (10)$$

In the expression (10), r is a parameter defined by the ratio of a phase error $\zeta$ to a linear region $n\Delta$ of a phase comparison characteristic of an $n\Delta$-type DLL. The ratio r falls within a range from 0.55 to 0.85 when the bit error rate is minimized.

The optimum modulation index calculating unit 36 calculates an optimum value of the modulation index $\beta$ using the expression (10) with the value of the S/N determined by the reception S/N assuming unit 14 and a value of the ratio r which ranges from 0.55 to 0.85.

The modulation index controlling unit 34 generates a control signal by which a value of the modulation index $\beta$ is set to the optimum value calculated by the optimum modulation index calculating unit 36.

Figure 17A:
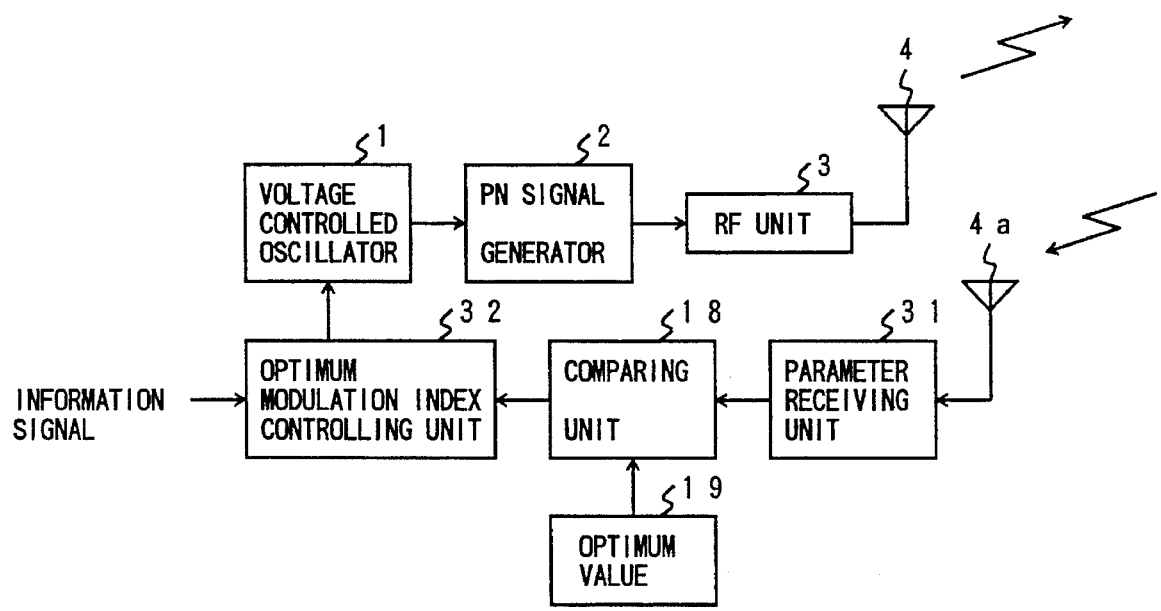
FIG. 17A is a block diagram of a transmitter of an eighth embodiment of a CRM-SS communication system according to the present invention.
Figure 17B:
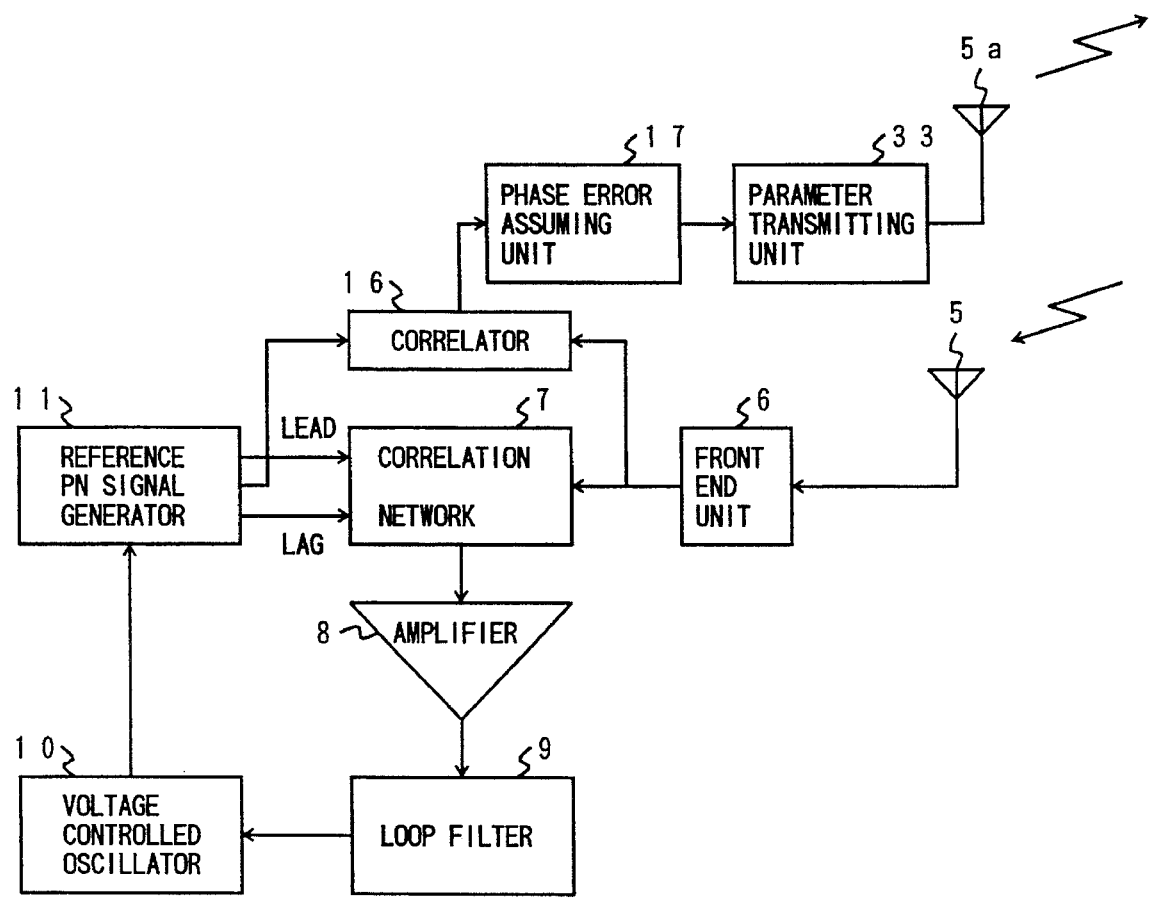
FIG. 17B is a block diagram of a receiver of the eighth embodiment of a CRM-SS communication system according to the present invention.

A description will now be given, with reference to FIGS. 17A and 17B, of an eighth embodiment according to the present invention. FIG. 17A is a block diagram of a transmitter of the eighth embodiment according to the present invention; FIG. 17B is a block diagram of a receiver of the eighth embodiment. In FIGS. 17A and 17B, parts that are the same as the parts shown in FIG. 7 and FIGS. 14A and 14B are given the same reference numerals, and descriptions thereof will be omitted.

The transmitter shown in FIG. 17A comprises a modulation unit the same as that of the sixth embodiment shown in FIG. 14A, the optimum modulation index controlling unit 32, the comparing unit 18 and the parameter receiving unit 31. The reference numeral 19 indicates an optimum value supplied to the comparing unit 18.

The receiver shown in FIG. 17B comprises a demodulation unit the same as that of the sixth embodiment shown in FIG. 14B, the correlator 16, the phase error assuming unit 17 and the parameter transmitting unit 33.

When a communication is started between the transmitter and the receiver, a training signal having a predetermined pattern is transmitted from the transmitter. The receiver receives the training signal, and the correlator 16 calculates correlation values between the received PN signal of the training signal and the reference PN signals, and obtains a mean value $R_m$ and a dispersion $\sigma$ of the correlation values. The phase error assuming unit 17 determines a phase error $\zeta$ corresponding to a sum R of the mean value $R_m$ and the dispersion $\sigma$ in accordance with the auto-correlation characteristic shown in FIG. 8. The parameter transmitting unit 33 calculates the parameter $r=\zeta/(n\Delta/2)$ which is a ratio of the determined phase error $\zeta$ to the linear region $n\Delta$ of a phase comparison characteristic of a DLL, and sends the result via the antenna 5a.

The parameter receiving unit 31 of the transmitter shown in FIG. 17A receives the result calculated by the parameter transmitting unit 33 via the antenna 4a, and send it to the comparing unit 18. The comparing unit 18 determines whether or not the value of the ratio r received from the receiver falls within a range from 0.55 to 0.85. If the ratio r does not fall within the range, the optimum modulation index controlling unit 32 varies the value of the modulation index, and another training signal is transmitted to the receiver in accordance with the varied modulation index. This operation is repeated until the ratio r falls within the optimum range. After the ratio r has fallen within the optimum range, the transmission of the training signal is stopped, and then the transmission of the information signal is started.

Figure 18A:
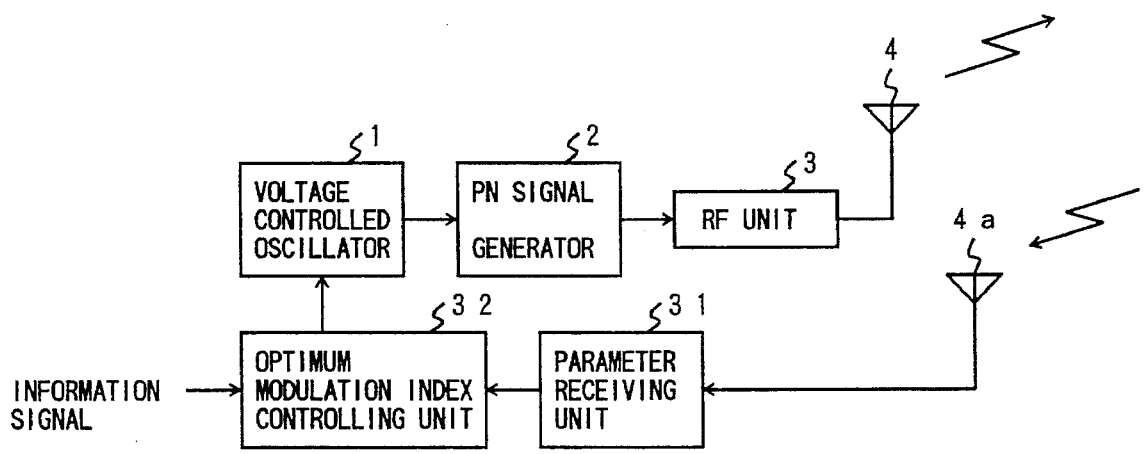
FIG. 18A is a block diagram of a transmitter of a ninth embodiment of a CRM-SS communication system according to the present invention.
Figure 18B:
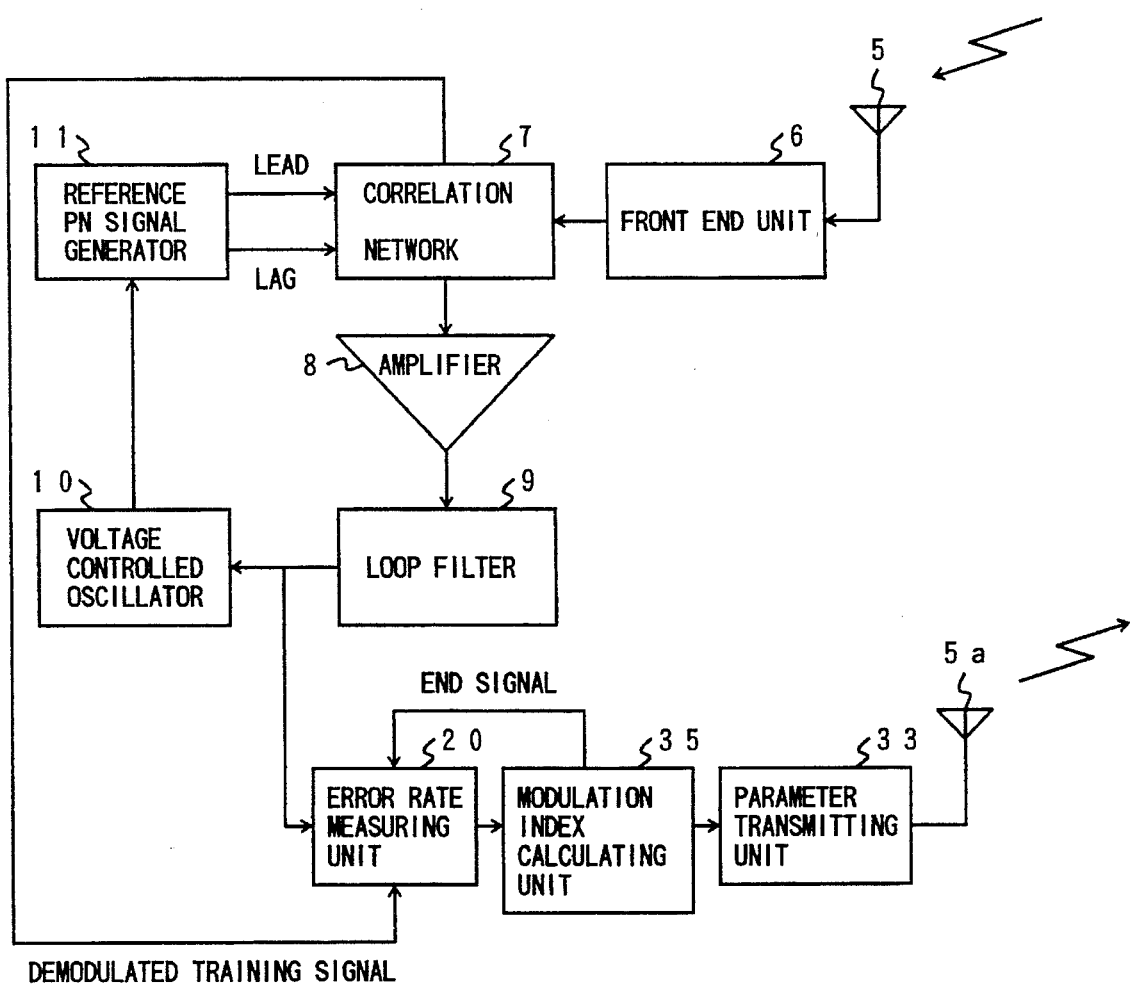
FIG. 18B is a block diagram of a receiver of the ninth embodiment of a CRM-SS communication system according to the present invention.

A description will now be given, with reference to FIGS. 18A and 18B, of a ninth embodiment according to the present invention. FIG. 18A is a block diagram of a transmitter of the ninth embodiment according to the present invention; FIG. 18B is a block diagram of a receiver of the ninth embodiment. In FIGS. 18A and 18B, parts that are the same as the parts shown in FIG. 9 and FIGS. 14A and 14B are given the same reference numerals, and descriptions thereof will be omitted.

The transmitter shown in FIG. 18A comprises a modulation unit the same as that of the sixth embodiment shown in FIG. 14A, the optimum modulation index controlling unit 32 and the parameter receiving unit 31.

The receiver shown in FIG. 18B comprises a demodulation unit the same as that of the sixth embodiment shown in FIG. 14B, the error rate measuring unit 20, a modulation index calculating unit 35 and the parameter transmitting unit 33.

The transmitter transmits a training signal having a predetermined signal when a communication is started between the transmitter and the receiver. The demodulation unit of the receiver receives and demodulates the training signal after a synchronization is acquired. The error rate measuring unit 20 measures the bit error by comparing a signal pattern of the demodulated training signal with the predetermined signal pattern. This measurement is performed by varying a value of the modulation index. The training signal transmitted by the transmitter has a signal length sufficient for measuring the bit error rate by varying a value of the modulation index.

The modulation index calculating unit 35 calculates an optimum value of the modulation index which minimizes the bit error rate in accordance with the result of measurement performed by using the modulation index as a parameter. The result is transmitted to the transmitter by the parameter transmitting unit 33 via the antenna 5a. After the modulation index is set to the optimum value, the modulation index calculating unit 35 sends an end signal to the error rate measuring unit 20 so as to stop an operation of the error rate measuring unit 20.

The transmitter shown in FIG. 18A receives the optimum value of the modulation index calculated by the modulation index calculating unit 35 through the antenna 4a and the parameter receiving unit 31. The optimum modulation index controlling unit 32 controls the modulation index to the optimum value, and then a transmission of an information signal is started after transmitting a communication start signal to the receiver.

In this embodiment, a controlling operation of the bit error rate is performed in an initial procedure, when a communication is started, by using the training signal. However, the training signal may be transmitted from the transmitter every time after a predetermined time has elapsed or a predetermined amount of data has been sent so that the optimum value of the loop gain is always controlled during the communication.

Figure 19A:
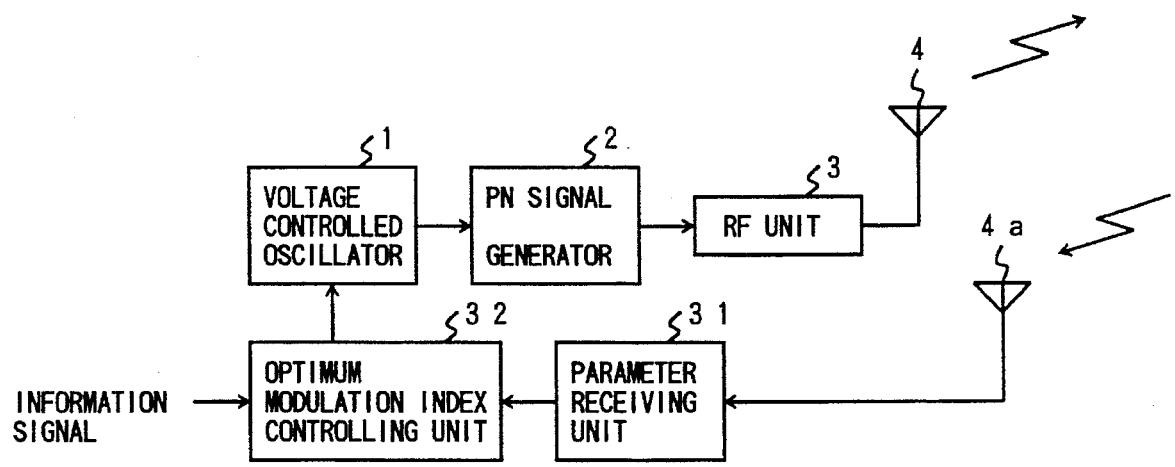
FIG. 19A is a block diagram of a transmitter of a tenth embodiment of a CRM-SS communication system according to the present invention.
Figure 19B:
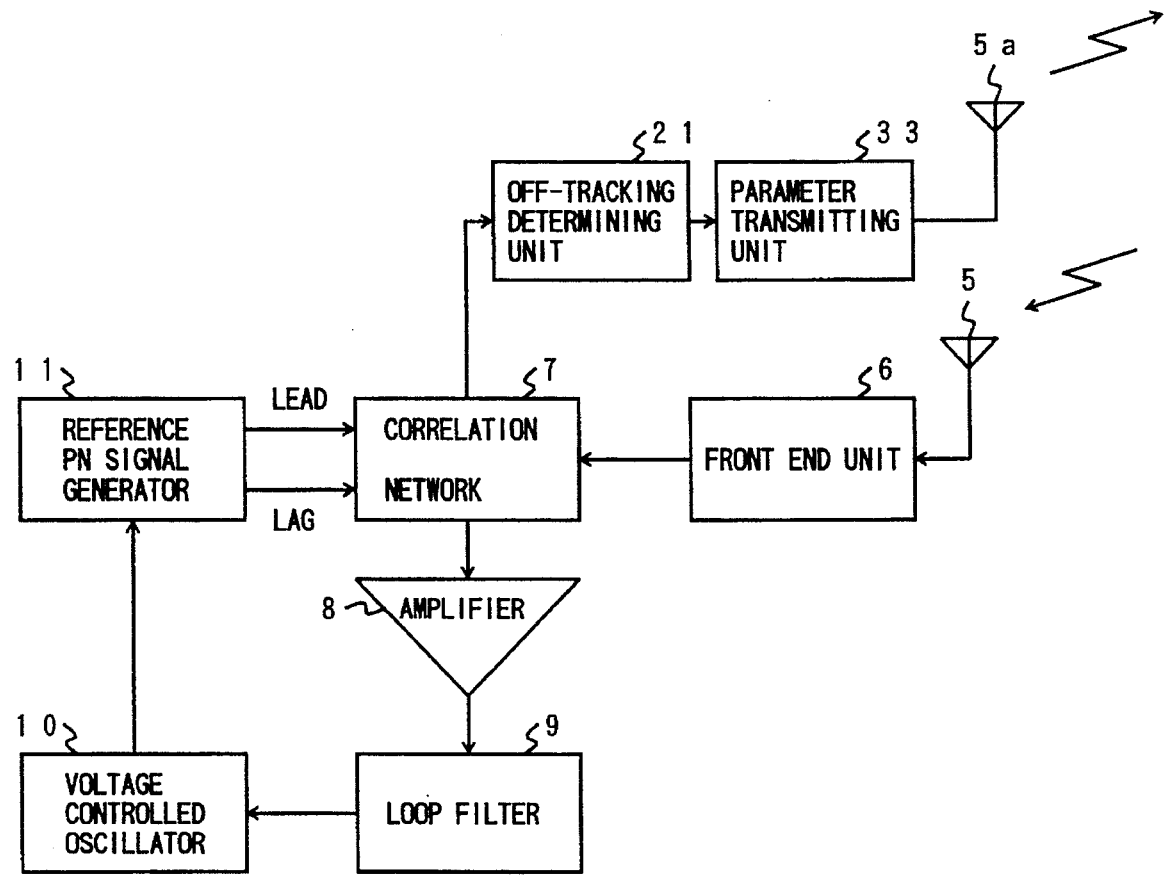
FIG. 19B is a block diagram of a receiver of the tenth embodiment of a CRM-SS communication system according to the present invention.

A description will now be given, with reference to FIGS. 19A and 19B, of a tenth embodiment according to the present invention. FIG. 19A is a block diagram of a transmitter of the tenth embodiment according to the present invention; FIG. 19B is a block diagram of a receiver of the tenth embodiment. In FIGS. 19A and 19B, parts that are the same as the parts shown in FIG. 10 and FIGS. 14A and 14B are given the same reference numerals, and descriptions thereof will be omitted.

A cause of an increase of the bit error rate, such that a value of the index modulation is greater than an optimum value, is due to an off-tracking. In the simulation for obtaining the graph shown in FIG. 13, the bit error rate due to the off-tracking is distinguished, and is indicated in the graph. In this embodiment, the modulation index is controlled by detecting the off-tracking, and sending information representing a synchronization state to the transmitter.

The transmitter shown in FIG. 19A comprises a modulation unit the same as that of the sixth embodiment shown in FIG. 14A, the optimum modulation index controlling unit 32 and the parameter receiving unit 31.

The receiver shown in FIG. 19B comprises a demodulation unit the same as that of the sixth embodiment shown in FIG. 14B, the off-tracking determining unit 21 shown in FIG. 10 and the parameter transmitting unit 33. The off-tracking determining unit 21 uses, for example, a correlation characteristic of the PN signal. A detection of the off-tracking for a 1-type DLL will be described below.

The transmitter transmits a training signal having a predetermined signal when a communication is started between the transmitter and the receiver. The demodulation unit of the receiver receives and demodulates the training signal after a synchronization is acquired.

In the receiver shown in FIG. 19B, the carrier wave (PN signal) of the training signal is received by the front end unit 6 via the antenna 5. The front end unit 6 demodulates the carrier wave to obtain the PN signal. The PN signal is split by a correlation network 7. The reference PN signal generator 11 generates two reference PN signals, one having a lead $\Delta/2$ and the other having a lag $\Delta/2$. The reference PN signals are input to the correlation network 7. In the correlation network 7, each of the reference PN signals is multiplied by either one of the split PN signals, and a sum R of the two products is output to the amplifier 8. The sum R is a constant value $R_0$, as shown in FIG. 11, in a region $|\zeta| \leq \Delta/2$ of the phase comparison characteristics of the $1\Delta$-type DLL in which tracking is well performed. If the sum R of the correlation value is less than $R_0$, the phase error $|\zeta| > \Delta/2$. In this condition, an exact demodulation of the signal is not performed, and thus an off-tracking tends to occur. Accordingly, it is determined that a tracking is well performed when R is equal to $R_0$, and that an off-tracking has occurred when R is less than $R_0$. When it is determined by the off-tracking determining unit 21 that an off-tracking has occurred, a signal representing an occurrence of the off-tracking is transmitted from the receiver to the transmitter.

Figure 20:
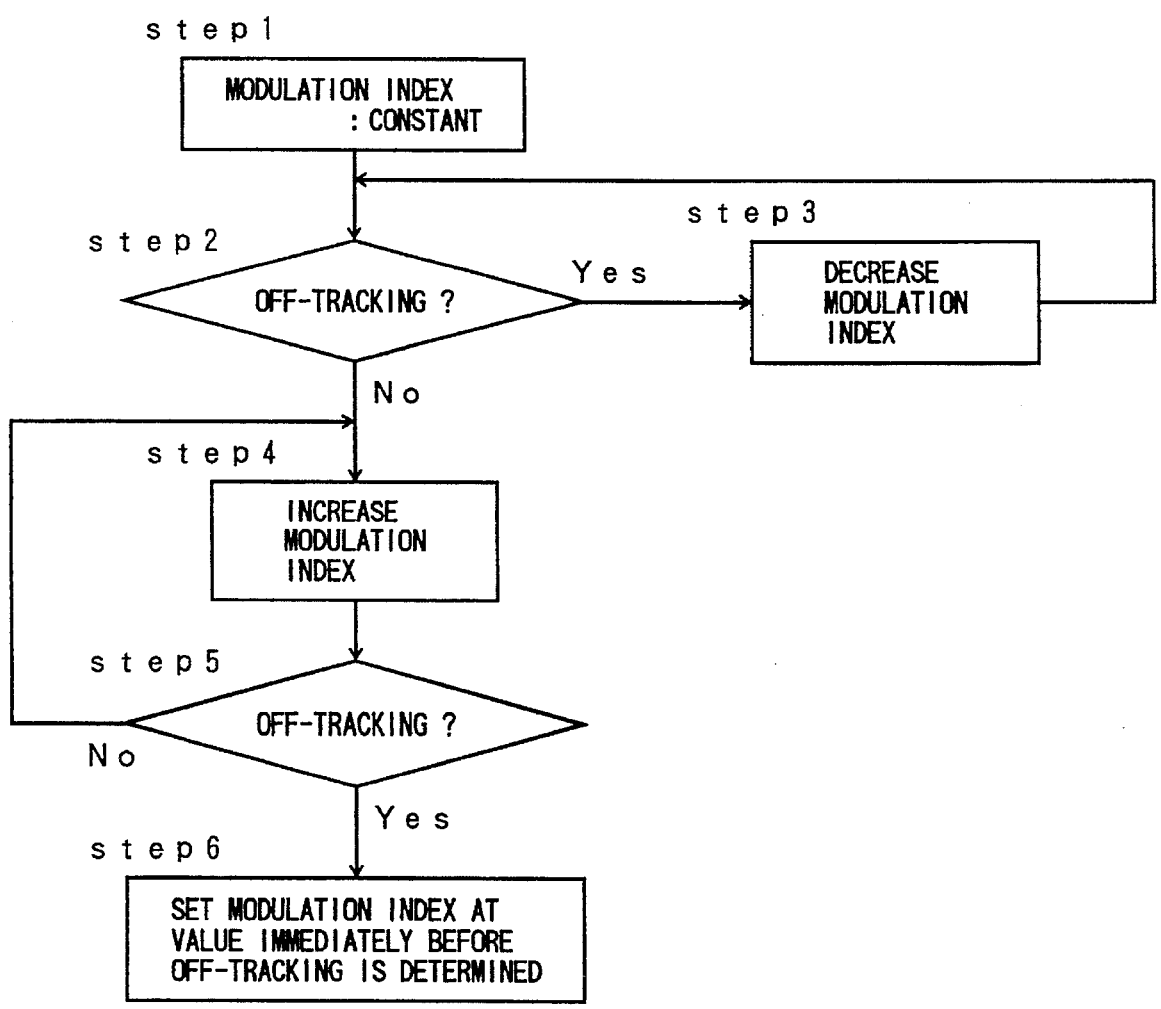
FIG. 20 is a flow chart of a controlling operation of a modulation index performed in the receiver shown in FIG. 19B.

FIG. 20 is a flow chart of a controlling operation of the modulation index in this embodiment. First, the modulation index is set, in step 1, to a constant value. It is determined, in step 2, whether or not an off-tracking has occurred. If it is determined that the off-tracking has occurred, the value of the modulation index is decreased, in step 3, so as to acquire a synchronization. After the synchronization has been acquired, the modulation index is gradually increased, in step 4, until an off-tracking occurs. When it is determined, in step 5, that an off-tracking has occurred, the routine proceeds to step 6 where a value of the modulation index is set to a value immediately before the off-tracking occurred.

The controlling operation of the modulation index can be performed in the same manner as that of the above-mentioned ninth embodiment. That is, the controlling operation can be performed while a training signal transmitted by the transmitter is being received. In this case, the training signal is transmitted for a duration sufficient for performing the controlling operation. The training signal may be transmitted from the transmitter every time after a predetermined time has elapsed or a predetermined amount of data has been sent so that the optimum value of the modulation index is always controlled during the communication. Additionally, the determination of the off-tracking and the controlling operation of the modulation index may be performed based on an information signal instead of using the training signal.

In the above-mentioned sixth through tenth embodiments, the bit error rate is minimized by controlling the modulation index to be an optimum value on the transmitter side. However, the bit error rate may be minimized by controlling other parameters in the above-mentioned expression (8), such as the transmission rate fm, the transmission power P or the chip width $\Delta$ on the transmitter side.

It should be noted that although, in the above-mentioned embodiments, the steady-state phase error and the tracking error are used as the phase error, there is another error which is a phase error due to a transient response. An effect of the error due to the transient response is increased as the modulation index is large. Accordingly, in a case where the modulation index is large, the error due to the transient response should be added to the phase error defined by the expression (5) so as to eliminate the effect of the error due to the transient response. In this case, the ratio r is defined as a ratio of the phase error including the error due to a transient response to the linear region of a phase comparison characteristic.

The present invention is not limited to the specifically disclosed embodiments, and variations and modifications may be made without departing from the scope of the present invention.

What is claimed is:

1. A clock rate modulation spread spectrum communication system having a transmitter and a receiver, the transmitter modulating a clock signal of a pseudonoise signal according to an information signal, the receiver having a delay locked loop for tracking a synchronization, the receiver demodulating the information signal received from the transmitter by using tracking control signals of the delay locked loop, said clock rate modulation spread spectrum communication system comprising:

calculating means for calculating a sum of a plurality of phase errors generated by different causes; and controlling means for controlling said receiver and/or said transmitter in accordance with the sum calculated by said calculating means so that a bit error rate in said receiver is minimized; and wherein said delay locked loop comprises an $n\Delta$ delay locked loop, and said controlling means controls said receiver and/or transmitter by varying at least one of parameters used in said receiver and transmitter so that a ratio r of a sum of a steady-state phase error and a tracking error to a linear region of a phase comparison characteristic of the delay locked loop falls within a predetermined range, said parameters including a loop gain K and a linear region $n\Delta$ of the phase comparison characteristic of the delay locked loop, a modulation index $\beta$, a transmission rate fm, a transmission power P and a chip width $\Delta$.

2. The clock rate modulation spread spectrum communication system as claimed in claim 1, wherein said calculating means calculates a sum of a steady-state phase error and a tracking error of the delay locked loop.

3. The clock rate modulation spread spectrum communication system as claimed in claim 1, wherein $0<n\leq 2$, and said predetermined range is from 0.55 to 0.85.

4. A clock rate modulation spread spectrum communication system having a transmitter and a receiver, the transmitter modulating a clock signal of a pseudonoise signal according to an information signal, the receiver having a delay locked loop for tracking a synchronization, the receiver demodulating the information signal received from the transmitter by using tracking control signals of the delay locked loop, said clock rate modulation spread spectrum communication system comprising:

calculating means for calculating a sum of a plurality of phase errors generated by different causes; and controlling means for controlling said receiver and/or said transmitter in accordance with the sum calculated by said calculating means so that a bit error rate in said receiver is minimized;

wherein said delay locked loop comprises an $n\Delta$ delay locked loop, where $0<n\leq 2$, and said controlling means controls a value of the loop gain so that a parameter r falls within a predetermined range, the parameter r being a ratio of a sum $\zeta$ of a steady-state phase error and a tracking error to a linear region $n\Delta$ of a phase comparison characteristic of the $n\Delta$ delay locked loop.

5. The clock rate modulation spread spectrum communication system as claimed in claim 4, wherein said predetermined range is from 0.55 to 0.88.

6. The clock rate modulation spread spectrum communication system as claimed in claim 4, wherein said calculating means calculates a sum of a steady-state phase error and a tracking error of the delay locked loop.

\* \* \* \* \*